(12) United States Patent
Green et al.

(10) Patent No.: US 11,077,850 B2
(45) Date of Patent: Aug. 3, 2021

(54) SYSTEMS AND METHODS FOR DETERMINING INDIVIDUALIZED DRIVING BEHAVIORS OF VEHICLES

(71) Applicant: Lyft, Inc., San Francisco, CA (US)

(72) Inventors: Logan Green, San Francisco, CA (US); Luc Vincent, Palo Alto, CA (US); Taggart Matthiesen, Kentfield, CA (US); Sameer Qureshi, Sunnyvale, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 16/563,789

(22) Filed: Sep. 6, 2019

(65) Prior Publication Data

US 2021/0070286 A1    Mar. 11, 2021

(51) Int. Cl.

| | |
|---|---|
| *B60W 30/095* | (2012.01) |
| *B60W 30/09* | (2012.01) |
| *G06K 9/00* | (2006.01) |
| *G05D 1/00* | (2006.01) |
| *G06T 7/20* | (2017.01) |

(52) U.S. Cl.
CPC ........ *B60W 30/0956* (2013.01); *B60W 30/09* (2013.01); *G05D 1/0088* (2013.01); *G06K 9/00825* (2013.01); *G06T 7/20* (2013.01); *G05D 2201/0212* (2013.01); *G05D 2201/0213* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 10,059,334 B1* | 8/2018 | Zhu .................. | G05D 1/0214 |
| 10,475,127 B1* | 11/2019 | Potter ............... | B60W 40/09 |
| 2012/0083960 A1* | 4/2012 | Zhu .................. | G05D 1/0214 |
| | | | 701/23 |
| 2015/0266455 A1* | 9/2015 | Wilson .............. | B60W 30/10 |
| | | | 701/93 |
| 2017/0039890 A1* | 2/2017 | Truong ............. | G07C 5/08 |
| 2018/0025553 A1* | 1/2018 | Bajwa .............. | G07C 5/008 |
| | | | 701/32.6 |
| 2018/0229724 A1* | 8/2018 | Gutmann ........... | G01S 17/936 |
| 2018/0267559 A1* | 9/2018 | Switkes ............ | B60W 40/13 |
| 2018/0300964 A1* | 10/2018 | Lakshamanan .... | G05D 1/0088 |
| 2018/0335785 A1* | 11/2018 | Miller ............. | B60W 50/0098 |

(Continued)

FOREIGN PATENT DOCUMENTS

WO    WO-2020205648 A1 *  10/2020    ............ B60W 50/00

*Primary Examiner* — Nicholas K Wiltey
(74) *Attorney, Agent, or Firm* — Baker Botts L.L.P.

(57) ABSTRACT

In one embodiment, a computing system of a vehicle may capture, using one or more sensors of the vehicle, sensor data associated with a first vehicle of interest. The computing system may identify one or more features associated with the first vehicle of interest based on the sensor data. The computing system may determine a driving behavior model associated with the first vehicle of interest based on the one or more features of the first vehicle of interest. The computing system may predict a driving behavior of the first vehicle of interest based on at least the determined driving behavior model. The computing system may determine a vehicle operation for the vehicle based on at least the predicted driving behavior of the first vehicle of interest.

20 Claims, 11 Drawing Sheets

(56) References Cited

U.S. PATENT DOCUMENTS

| | | | |
|---|---|---|---|
| 2019/0279329 A1* | 9/2019 | Tang | G06K 9/00671 |
| 2020/0031195 A1* | 1/2020 | Woods | B60H 1/00964 |
| 2020/0184235 A1* | 6/2020 | Kwon | G06K 9/00805 |

* cited by examiner

SYSTEMS AND METHODS FOR DETERMINING INDIVIDUALIZED DRIVING BEHAVIORS OF VEHICLES

BACKGROUND

Autonomous vehicles or manually-driven vehicles with driver-assist features may perform various operations (e.g., braking, turning, alerting, etc.) based on their surrounding environment. A vehicle typically perceives its environment using sensors such as cameras, radars, and LiDARs. A computing system (e.g., an on-board computer and/or a remote server computer) may then process and analyze the sensor data to make operational decisions in response to situations detected in the surrounding environment.

The suitability of the operational decisions largely depends on the information available to the vehicle. Typically, the information available is limited to what is presently perceived by the vehicle's sensors. The sensor data enables the vehicle to determine the contextual state of its surrounding environment, which could include other vehicles nearby. Although the current contextual state, along with generalized assumptions about driving behavior, could sufficiently enable the vehicle to operate safely, the operational decisions made by the vehicle is nevertheless reactive. As such, if another driver behaves unexpectedly or deviates from the norm (e.g., failing to stop at a stop sign), the vehicle would have to react appropriately in a short amount of time based on the current sensory input available to it.

DESCRIPTION OF EXAMPLE EMBODIMENTS

Figure 1:
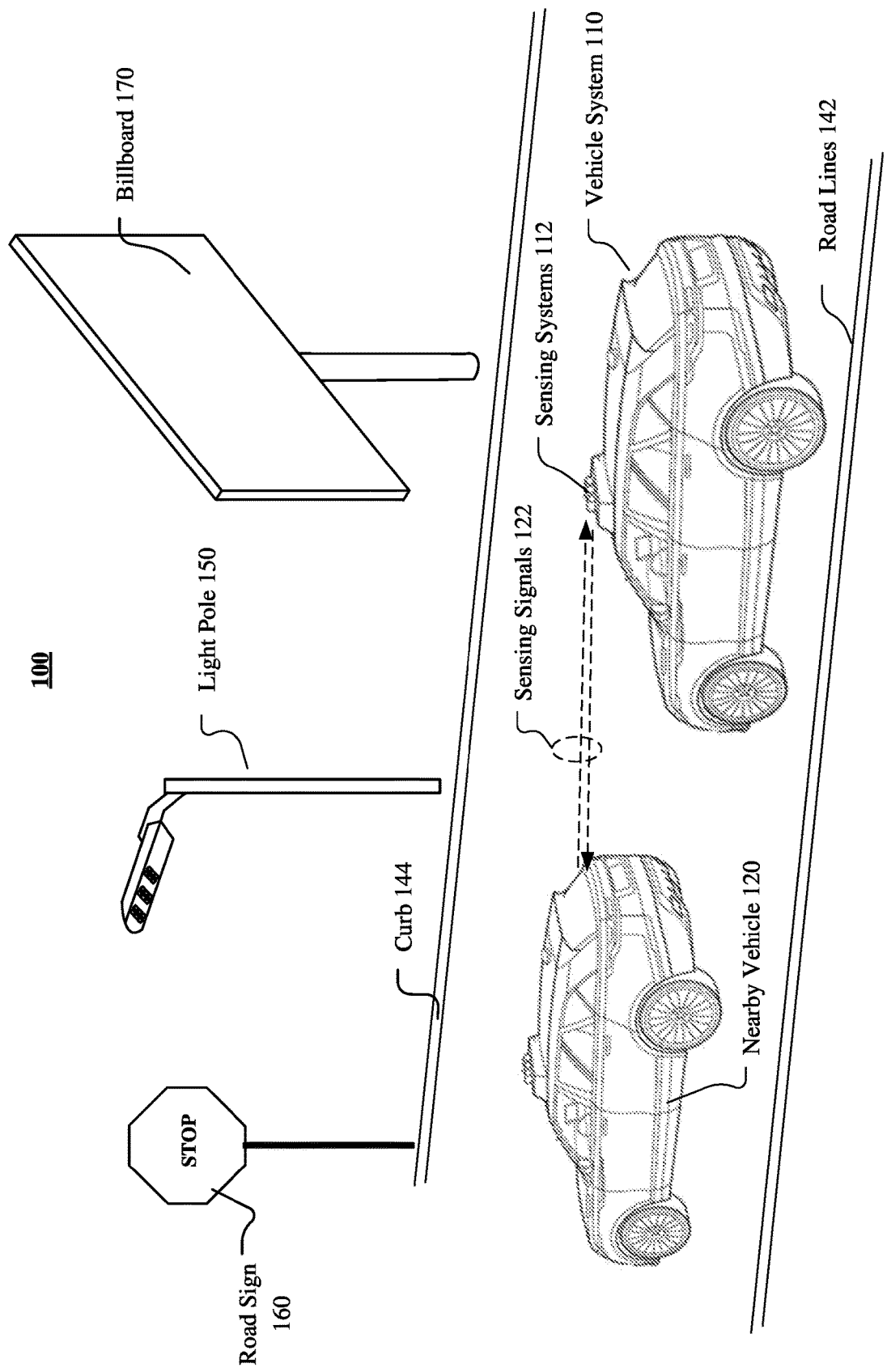
FIG. 1 illustrates an example situation for a data-gathering vehicle system to collect vehicle data of a nearby vehicle and contextual data of the surrounding environment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Vehicles (e.g., autonomous vehicles, manually-driven vehicles, computer-assisted driven vehicles, hybrid human-autonomous driven vehicles, etc.) may be equipped with various features which are designed to provide useful information for the vehicles to respond to the surrounding environment. For example, a vehicle may use sensors (e.g., one or more cameras, radars or LiDARs) to monitor pedestrians and other vehicles in the surrounding environment and make the appropriate driving decisions (e.g., braking, accelerating, turning, etc.) and/or invoke the appropriate safety features (e.g., issuing a hazard warning to the driver and passengers). The vehicle may perceive the driving environment based on real-time sensor data and determine the appropriate response accordingly. For example, the vehicle may use one or more computing systems (e.g., on-board computers) to make vehicle-operation decisions in response to different situations (e.g., driving behaviors of nearby vehicles) of the surrounding environment. However, the vehicle-operation decisions may not always be optimal since they are made in response to presently-perceived environmental data without knowing the exact driving behaviors of the nearby vehicles (because human drivers may drive differently from one another and may drive in unexpected ways). For example, a human driver of a nearby vehicle in the surrounding environment may unexpectedly make a turn without using turning lights or may fail to stop at a stop sign. As another example, a first human driver may have a different driving behavior from a second human driver even the two human drivers are under the same conditions of the surrounding environment. Although the vehicle may be able to react in time to such unexpected behavior of the nearby vehicle, reacting to events after the fact limits the vehicle's reaction time and options and is therefore suboptimal.

To improve vehicle safety and enhance a vehicle's ability to make optimal decisions, particular embodiments described herein enable vehicles to predict driving behaviors of nearby vehicles based on observations of specific vehicle and vehicle type past driving behavior. For example, in particular embodiments, certain vehicles on the road may be equipped with sensors (e.g., cameras, radars, LiDARs, sonars, etc.) to observe the driving behavior of other vehicles and associate such aggregated and anonymized observations with respective anonymous vehicle identifiers associated with those vehicles. In particular embodiments, the data-gathering vehicles may be configured to only observe and gather the past driving behavior of individual vehicles that have opted-in or given their consent. For example, a vehicle may opt-in by registering with an entity associated with the data-gathering service or attaching a particular QR code or other identifier on the vehicle's body (e.g., on its license plate) as evidence of consent. Additionally or alternatively, the past driving behavior of individual vehicles may be associated with one or more anonymous features of that vehicle rather than an anonymous vehicle identifier. For example, the observed past driving behaviors may be associated with vehicles of the same type (e.g., sports car, SUV, sedans, bus, minivan, etc.), vehicles having the same driving behavior, vehicles operating in the same geographic region, and/or the same vehicle identified based on its anonymous vehicle identifier.

A given vehicle needing to make operational decisions may use the past driving behavior data of individual nearby vehicles to predict what they would likely do now, which in turn helps the vehicle to make improved operational decisions. In particular embodiments, a prediction model (e.g., machine-learning model) may predict the likely current driving behaviors of a particular nearby vehicle based on its past behaviors. For example, the prediction model may be trained to predict, based the past driving behavior data and vehicle contextual data (or environmental data) at time to (e.g., road layout, traffic, number of vehicles nearby, weather, time of day, road conditions, etc.), where the vehicle would be in the immediate future (e.g., at time ti). The prediction model may be trained using a collection of past driving behavior data collected by a fleet of data-gathering vehicles. During the training process, the prediction model may adjust a number of weighting factors of the prediction model based on comparisons between the known behaviors of the observed vehicles (the ground truth) and the predicted behaviors of those vehicles generated using the current weighting factors of the prediction model.

During the inference process after the prediction model has been trained, the vehicle may first identify a nearby vehicle (e.g., using computer vision, radar, and LiDAR perception technologies). The nearby vehicle may be identified using an anonymous vehicle identifier associated with the vehicle's license plate or other anonymous features associated with that nearby vehicle (e.g., a vehicle type, a geographic region associated with the vehicle, a particular driving behavior). Then, the vehicle may retrieve, from a database, the past driving behavior data associated with the identified nearby vehicle or one or more anonymous features and feed that past driving behavior data to the trained prediction model to predict the driving behaviors and trajectories of the nearby vehicle. When there is no past driving behavior data for the particular nearby vehicle, the vehicle may retrieve the average past driving behavior data associated with the same type of vehicle (e.g., SUV, car, trucks, school bus etc.), the average driving data associated with vehicles having the same driving behavior, and/or the average past driving data associated with vehicles of the same geographic region (e.g., city, state, etc.) and feed the retrieved average driving behavior data to the prediction model to predict the driving behaviors of that nearby vehicle. After that, the vehicle may determine the appropriate response accordingly based on the predicted driving behaviors and trajectories of the nearby vehicle.

Particular embodiments greatly improve the safety, ride experience, and decision making of vehicles by enabling them to take into consideration the predicted driving behaviors and trajectories of other nearby vehicles when making operational decisions. For example, if the vehicle predicts that a nearby vehicle has a reasonable chance (e.g., above a threshold level) of failing to stop at the stop sign, the vehicle may wait a few seconds at the all-way-stop intersection before proceeding to allow that nearby vehicle to pass first or make sure it will yield the right-of-way. As another example, if the vehicle predicts that a nearby vehicle may make a turn even though its turning signals are not flashing, the vehicle may take a safer route or avoid being in the predicted trajectory of the nearby vehicle to decrease the chance of collision, even though that nearby vehicle has not yet started to make the turn. As another example, if the vehicle predicts that a nearby vehicle has a reasonable chance (e.g., above a threshold level) to change its speed suddenly (e.g., sudden stop, harsh braking or acceleration), the vehicle may increase its safety distance from that vehicle.

FIG. 1 illustrates an example situation 100 for a data-gathering vehicle system 110 to collect vehicle data of a nearby vehicle 120 and contextual data of the surrounding environment. In particular embodiments, the vehicle system 110 (e.g., autonomous vehicles, manually-driven vehicles, computer-assisted-driven vehicles, human-machine hybrid-driven vehicles, etc.) may have a number of sensors or sensing systems 112 for monitoring the vehicle status, other vehicles and the surrounding environment. The sensors or sensing systems 112 may include, for example, but are not limited to, cameras (e.g., optical camera, thermal cameras), LiDARs, radars, speed sensors, steering angle sensors, braking pressure sensors, a GPS, inertial measurement units (IMUs), acceleration sensors, etc. The vehicle system 110 may include one or more computing systems (e.g., a data collection device, a mobile phone, a tablet, a mobile computer, an on-board computer, a high-performance computer) to collect data about the vehicle, the nearby vehicles, the surrounding environment, etc. In particular embodiments, the vehicle system 110 may collect data of the vehicle itself related to, for example, but not limited to, vehicle speeds, moving directions, wheel directions, steering angles, steering force on the steering wheel, pressure of braking pedal, pressure of acceleration pedal, acceleration (e.g., based on IMU outputs), rotation rates (e.g., based on IMU/gyroscope outputs), vehicle moving paths, vehicle trajectories, locations (e.g., GPS coordination), signal status (e.g., on-off states of turning signals, braking signals, emergence signals), human driver eye movement, head movement, etc.

In particular embodiments, the vehicle system 110 may use one or more sensing signals 122 of the sensing system 112 to collect data of the nearby vehicle 120. For example, the vehicle system 110 may collect the vehicle data and driving behavior data related to, for example, but not limited to, vehicle images, vehicle specification data (e.g., lengths, widths, heights, and weights), vehicle manufacturer, type, and models, vehicle performance information (e.g., all-wheel drive mode or horsepower as indicated by related text indicators), vehicle speeds, acceleration, vehicle moving paths, vehicle driving trajectories, locations, turning signal status (e.g., on-off state of turning signals), braking signal status, a distance to another vehicle, a relative speed to another vehicle, a distance to a pedestrian, a relative speed to a pedestrian, a distance to a traffic signal, a distance to an intersection, a distance to a road sign, a distance to curb, a relative position to a road line, an object in a field of view of the vehicle, positions of other traffic agents, aggressiveness metrics of other vehicles, etc. In addition, the sensing system 112 may be used to identify the nearby vehicle 120, which could be based on an anonymous vehicle identifier based on the license plate number, a QR code, or any other suitable identifier that uniquely identifies the nearby vehicle.

In particular embodiments, the vehicle system 110 may collect contextual data of the surrounding environment based on one or more sensors associated with the vehicle system 110. In particular embodiments, the vehicle system 110 may collect data related to road conditions or one or more objects of the surrounding environment, for example, but not limited to, road layout, pedestrians, other vehicles (e.g., 120), traffic status (e.g., number of nearby vehicles, number of pedestrians, traffic signals), time of day (e.g., morning rush hours, evening rush hours, non-busy hours), type of traffic (e.g., high speed moving traffic, accident events, slow moving traffic), locations (e.g., GPS coordination), road conditions (e.g., constructing zones, school zones, wet surfaces, ice surfaces), intersections, road signs (e.g., stop sign 160, road lines 142, cross walk), nearby objects (e.g., curb 144, light poles 150, billboard 170), buildings, weather conditions (e.g., raining, fog, sunny, hot weather, cold weather), or any objects or agents in the surrounding environment. In particular embodiments, the contextual data of the vehicle may include navigation data of the vehicle, for example, a navigation map, a navigating target place, a route, an estimated time of arriving, a detour, etc. In particular embodiments, the contextual data of the vehicle may include camera-based localization data including, for example, but not limited to, a point cloud, a depth of view, a two-dimensional profile of environment, a three-dimensional profile of environment, stereo images of a scene, a relative position (e.g., a distance, an angle) to an environmental object, a relative position (e.g., a distance, an angle) to road lines, a relative position in the current environment, a traffic status (e.g., high traffic, low traffic), driving trajectories of other vehicles, motions of other traffic agents, speeds of other traffic agents, moving directions of other traffic agents, signal statuses of other vehicles, etc. In particular embodiments, the vehicle system 110 may have a perception of the surrounding environment based on the contextual data collected through one or more sensors in real-time and/or based on historical contextual data stored in a vehicle model database.

In particular embodiments, the vehicle data and contextual data may be collected by a fleet of vehicles and aggregated into a database in a remote server computer. The vehicle data may be aggregated into the corresponding vehicle models (e.g., individualized vehicle models, vehicle type models, vehicle region models, vehicle models associated with certain driving behaviors) as weight values or parameter values of corresponding vehicle models and stored in a database of a remote server computer. A vehicle model may include historical driving behavior data associated with one or more anonymous features (e.g., an anonymous vehicle identifier for an individual vehicle, a vehicle type, a vehicle region, a driving behavior). The historical driving behavior data may include vehicle characterization vectors each including a number of coefficients or parameters describing the corresponding past driving behaviors of corresponding vehicles. An individualized vehicle model may include vehicle characterization vectors describing the past driving behaviors of a vehicle associated with a particular anonymous identifier. A vehicle type model may include vehicle characteristic vectors describing historical driving behaviors associated with a vehicle type (e.g., SUVs, sport cars, buses, sedans, trucks, minivans, etc.). A vehicle region model may include vehicle characteristic vectors describing historical driving behaviors associated with vehicles of a geographic region (e.g., a state, a city, a county, a town, a college, a university, a community, etc.). The vehicle models (e.g., individualized vehicle models, vehicle type models, vehicle region models) may also be referred to as vehicle driving behavior models (e.g., individualized vehicle driving behavior models, vehicle type-based driving behavior models, vehicle region-based driving behavior models) in this disclosure.

In particular embodiments, the vehicle type model of a particular vehicle type may be determined based on an average or weighted average of vehicle data of a number of vehicles of the same vehicle type. For example, the driving behavior vectors describing the driving behaviors of a truck vehicle model may be determined based on an average or weighted average of the corresponding driving behavior vectors of a number of truck vehicles. As another example, the driving behavior vectors describing the driving behavior of a SUV vehicle model may be determined based on an average or weighted average of the corresponding driving behavior vectors of a number of SUV vehicles. In particular embodiments, the vehicle region model of a geographic region may be determined based on an average or weighted average of vehicle data of a number of vehicles associated with the same region. For example, the driving behavior vectors describing the driving behaviors of vehicle associated with a particular state may be determined by an average or weighted average of the corresponding driving behavior vectors of a number of vehicles associated with that state. As another example, the driving behavior vectors describing the driving behaviors of vehicles associated with a city may be determined by an average or weighted average of the corresponding driving behavior vectors of a number of vehicles associated with that city. In particular embodiments, the vehicle region model of a geographic region may be determined based on an average or weighted average of a number of vehicle region models associated with a number of sub-regions. For example, the driving behavior vectors describing the driving behaviors of vehicles associated with a state may be determined by an average or weighted average of the corresponding driving behavior vectors of a number of vehicle region models associated with a number of cities of that state.

In particular embodiments, the vehicle data collected by the fleet of vehicles may be aggregated into vehicle models associated with particular driving behaviors. In particular embodiments, after receiving the uploaded data from a fleet of vehicles, the remote server computer may categorize the driving behaviors of a large number of vehicles (as observed by the fleet of vehicles) into different driving behavior categories (e.g., failing to stop at stop sign, harsh braking, making a turn without turning on signals, etc.). The remote server computer may generate vehicle models associated with respective driving behaviors. As an example and not by way of limitation, a vehicle model associated with a particular driving behavior may be determined based on an average or weighted average of the driving behavior data of a number of vehicles having that particular driving behavior. A vehicle model associated with a particular driving behavior may include vehicle characterization vectors describing the past driving behaviors observed from a number of vehicles having that particular driving behavior. A vehicle model associated with a particular driving behavior may include a number of anonymous vehicle identifiers associated with vehicles that have been observed to have that particular driving behavior.

In particular embodiments, when a nearby vehicle is identified to be associated with an anonymous vehicle identifier which is associated with a particular driving behavior, the corresponding vehicle model for that particular driving behavior may be retrieved and used for predicting the driving behavior of that nearby vehicle (instead of using the individualized vehicle models). In particular embodiments, when a nearby vehicle is observed to have a particular driving behavior, the vehicle model associated with that particular driving behavior may be directly retrieved (e.g., from a vehicle model database) and used for predicting the driving behaviors of the nearby vehicle (without identifying that vehicle by the anonymous vehicle identifier or using an individualized vehicle model). As a result, by using the vehicle models associated with particular driving behaviors, the vehicle may predict the driving behaviors of nearby vehicles without identifying these vehicles by anonymous vehicle identifiers and without using individualized vehicle models.

In particular embodiments, a vehicle driving behavior model (e.g., an individualized driving behavior vehicle model or a vehicle type-based driving behavior model) may include vehicle specification information specific to an individual vehicle or a vehicle type. In particular embodiments, the vehicle specification information may include, for example, but is not limited to, a vehicle length, a vehicle width, a vehicle height, a vehicle weight (e.g., a maximum weight, a minimum weight), vehicle performance parameters (e.g., horsepower), vehicle configuration (e.g., full-wheel drive), vehicle manufacturers and models, etc. In particular embodiments, the vehicle specification information may be determined based on data collected by sensors or sensing systems (e.g., cameras, LiDAR systems, radar systems, or any suitable sensors) equipped on the vehicles of a data collecting fleet. For example, the vehicle's length, width and height may be determined by a LiDAR system of a data collecting vehicle. As another example, the vehicle performance parameters (e.g., horsepower), configuration (e.g., full-wheel drive), or vehicle manufacturers and models may be determined based on one or more indicators (e.g., texts, signs, logos) captured in vehicle images. In particular embodiments, the vehicle specification information may be obtained from a database including specification information of different type of vehicles. In particular embodiments, the vehicle specification information stored in the database may be input by human experts or obtained from on-line data sources.

In particular embodiments, the vehicle specification information associated with an individual vehicle or a type of vehicle may be determined by a computer vision algorithm or a machine-learning (ML) model for extracting vehicle information (e.g., models, years, manufacturers) from images. In particular embodiments, the vehicle system may use a computer vision algorithm or a machine-learning (ML) model to recognize a vehicle type or model from an image including at least a part of that vehicle (e.g., a bumper, a side profile, a corner, a front profile, a back profile, a window shape, a vehicle shape, a blur profile, etc.) and determine the corresponding specification information based on that particular vehicle type or model. As an example and not by way of limitation, the vehicle system may capture an image including the bumper of a nearby truck. The vehicle system may recognize the truck's manufacturer and model (e.g., Ford F-150) and determine its specification information such as length, width, height, and weight based on the truck's manufacturer and model. As another example, the vehicle system may recognize a vehicle manufacturer and model based on an image including a side profile of that vehicle and determine its specification information based on the vehicle's manufacturer and model. After being determined, the specification information may be included (e.g., stored as vectors) in the corresponding individualized vehicle driving behavior models or vehicle type-based driving behavior models and may be stored in the vehicle model database. It is notable that the image data used for determining the specification information is for example purpose only and the data that can be used for determining the specification information is not limited thereto. The data that can be used for determining the specification information may be generated by any suitable sensors or sensing systems. For example, the vehicle specification information may be determined based on a point cloud of the vehicle by a LiDAR system. As another example, the vehicle specification information may be determined based on data generated by a radar system. As will be described in later sections of this disclosure, the vehicle specification information may be used to improve the vehicle system's perception of the surrounding environment (for example by providing additional information about an object that may not be able to be perceived at that moment in time) and improve the determination of vehicle operations during the planning stage (for example by knowing more information about the capabilities of a vehicle for prediction than can be perceived by its size and shape alone).

In particular embodiments, the vehicle data may be collected by a fleet of vehicles and aggregated into the corresponding vehicle models (e.g., individualized vehicle models, vehicle type models, vehicle region models, vehicle models associated with certain driving behaviors). As an example and not by way of limitation, when one or more vehicles of the fleet of vehicles identify a vehicle associated with an individualized vehicle model, the feet vehicles may collect the driving behavior data of that vehicle and aggregate the collected data into the corresponding individualized vehicle model. As another example, when one or more vehicles of the fleet of vehicles identify a vehicle which has never been observed before, the fleet vehicles may collect the driving behavior data of that vehicle and upload the collected data to a database of a remote server computer which may generate a new vehicle model for that vehicle. As another example, when one or more vehicles of the fleet of vehicles identify a vehicle of a particular type, the fleet vehicles may collect the driving behavior data of that vehicle and aggregate the collected data into the corresponding vehicle type model. As another example, when one or more vehicles of the fleet of vehicles identify a vehicle associated with a particular geographic region, the fleet vehicles may collect the driving behavior data of that vehicle and aggregate the collected data into the corresponding vehicle region model. As another example, when one or more vehicles of the fleet of vehicles identify a vehicle having a particular driving behavior, the fleet vehicles may collect the driving behavior data of that vehicle and aggregate the collected data (with an optional anonymous vehicle identifier) into the corresponding vehicle model associated with the particular driving behaviors. In particular embodiments, the system may determine an aggressiveness score or a politeness score of a vehicle based on the corresponding driving behavior data and store these scores in the corresponding vehicle models in the database.

In particular embodiments, the driving behaviors of a nearby vehicle may be compared to correct or expected driving behaviors as predicted by a prediction model. When its driving behaviors deviate from the correct or expected driving behaviors, the corresponding driving data may be collected and aggregated into the corresponding vehicle models. As an example and not by way of limitation, the vehicle may use a prediction model to predict a driving trajectory of a nearby vehicle. When the actual driving trajectory of the nearby vehicle deviates from the predicted trajectory, the vehicle may collect the driving behavior data of the nearby vehicle and aggregate that the collected driving behavior data into the corresponding vehicle models. As another example, the ego vehicle may use a prediction model to predict a driving speed of a nearby vehicle. When the actual driving speed of the nearby vehicle deviates from the predicted driving speed for a threshold speed, the vehicle may collect the driving behavior data of the nearby vehicle and aggregate that the collected driving behavior data into the corresponding vehicle models. The collected driving behavior data may be uploaded to the database in the remote server computer and synchronized to a fleet of vehicles, as will be described in later sections of this disclosure.

It is notable that the driving behavior of a vehicle may vary based on the context of the driving environment. For example, even though a vehicle may typically drive within the speed limit, it may suddenly exceed the speed limit when it is crossing an intersection with a yellow light. As another example, a vehicle that typically follows traffic rules in normal situations may have one or more unexpected driving behaviors (e.g., failing to stop at stop sign, failing to yield, harsh acceleration, etc.) when there are very few surrounding vehicles or during particular times of day (e.g., morning rush hours or evening rush hours). As another example, a vehicle that typically follows traffic rules in normal situations may drive more aggressively when other nearby vehicles are doing the same. In particular embodiments, the system may aggregate both the driving behavior data and the contextual data into the vehicle model database (e.g., as driving behavior vectors, weight values and/or parameter values) and use the driving behavior data and the related contextual data for training the prediction model.

In particular embodiments, to protect privacy, the vehicle system 110 may detect an opt-out or opt-in indicator associated with the nearby vehicle 120 and decide whether to exclude that vehicle 120 from being included for data collection process. The nearby vehicle 120 may wish to opt-in since allowing other vehicles to better predict its behavior would improve its own safety. However, for those who do not wish for its driving behavior to be gathered, they could simply opt-out or not opt-in. As an example and not by way of limitation, the system may detect a sticker (e.g., QR code) or a sign on the nearby vehicle 120 indicating that the driver or owner of this vehicle asks to be excluded from or included in the driving-behavior data collection process. If the nearby vehicle 120 has not opted-in or has opted-out, the vehicle system 110 may disregard and not store any driving behavior data related to this vehicle 120. As another example, the system may have a list of anonymous vehicle identifiers whose corresponding driving behavior data will be disregarded and will not be stored in the database. In particular embodiments, unless the nearby vehicle 120 has opted-in, the system may not generate individualized vehicle model for that vehicle. Instead, the system may only aggregate the data related to that vehicle into corresponding vehicle type model, vehicle region model, or vehicle model associated with particular driving behaviors, which may not include individualized information for any particular vehicles.

Figure 2A:
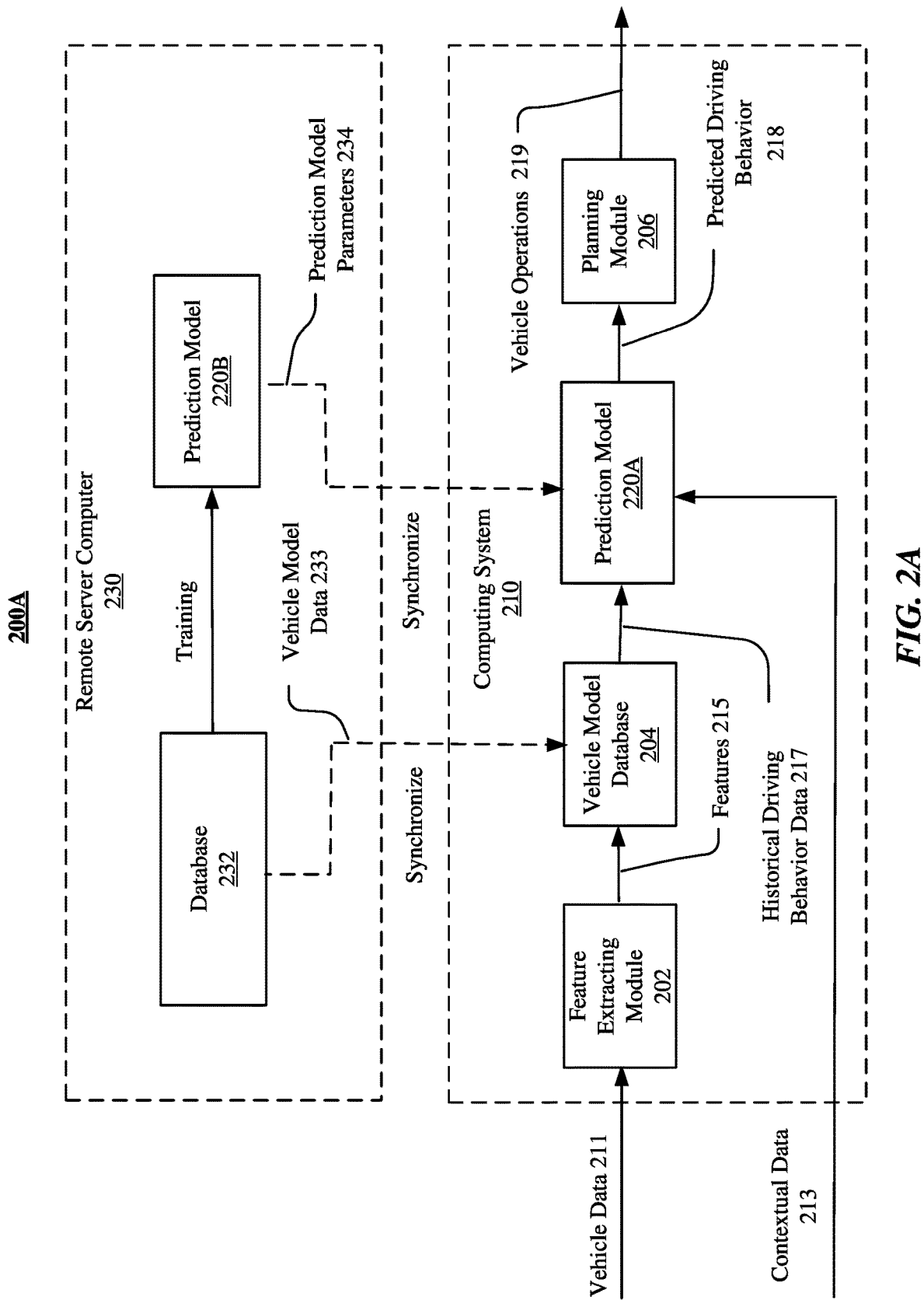
FIG. 2A illustrates an example framework for distributing to vehicles the vehicle model data and a prediction model which is trained for predicting driving behaviors of other vehicles.

FIG. 2A illustrates an example framework 200A for distributing to vehicles the vehicle model data and a prediction model which is trained for predicting driving behaviors of other vehicles. In particular embodiments, framework 200A may include a local computing system 210 on a vehicle, which could be or include, for example, a data collection device, a mobile phone, a tablet, a mobile computer, an on-board computer, a high-performance computer, etc. The computing system 210 may include a feature extracting module 202, a vehicle model database 204, a prediction model 220A (e.g., a machine-learning model), and a planning module 206, each of which will be described in further detail below. The computing system 210 may be associated with and communicate with a remote server computer 230. The remote server computer 230 may include a database 232 and a prediction model 220B. The database 232 may include historical driving data and related contextual data of a large number of vehicles collected by a fleet of vehicles. The driving data of a larger number of vehicles stored in the database 232 may be aggregated into a number of vehicle models (e.g., individualized vehicle models, vehicle type models, vehicle region models, vehicle models associated with particular driving behaviors). For example, the database 232 may include anonymous driving identifiers of a number of vehicles with corresponding past driving behaviors and trajectories information. As another example, the database 232 may include the information related to various vehicle types, geographic regions, and driving behaviors associated with respective vehicle models.

Figure 2B:
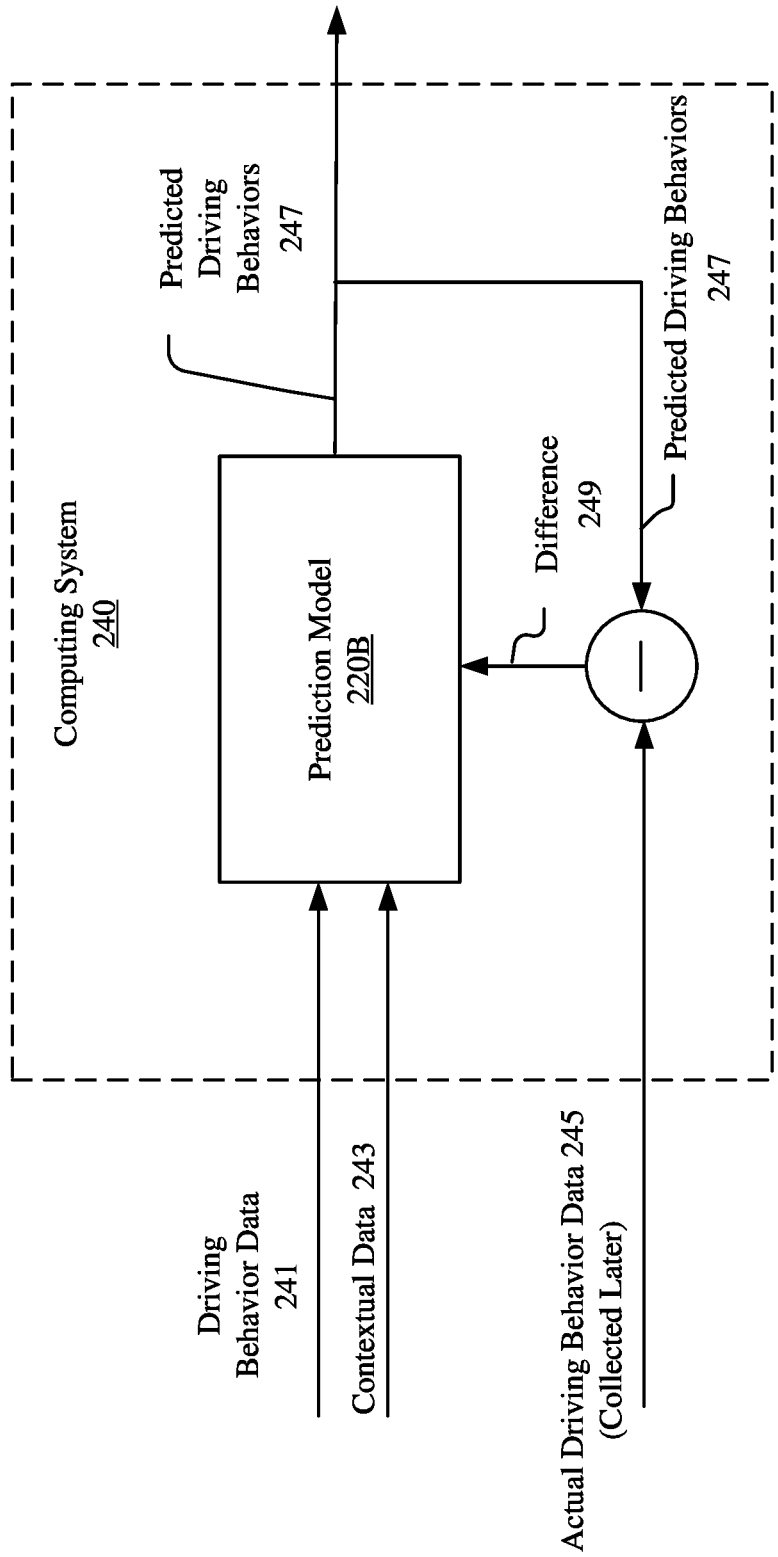
FIG. 2B illustrates an example process for training a prediction model using driving behavior data and contextual data of the surrounding environment.

FIG. 2B illustrates an example process 200B for training a prediction model 200B using driving behavior data 241 and contextual data 243 of the surrounding environment. In particular embodiments, the prediction model 220B may be trained in the remote server computer 230 using the data (e.g., historical driving behavior data and related contextual data of a large number of vehicles) accessed from the database 232. In particular embodiments, the training of the prediction model 220B may be performed by a computing system located locally on a vehicle. Each training sample may include contextual data 243, which may include a snapshot (e.g., at time to) of a vehicle's surrounding environment with one or more nearby vehicles. The training sample may further include past driving behavior data 241 of the one or more nearby vehicles. Additionally, the training sample may be associated with the actual, known driving behavior data 245 of the one or more nearby vehicles at the next time instant, ti (e.g., collected at a later time and used as the ground truth for training the prediction model 220B). In particular embodiments, the driving behavior data 241 or 245 may be presented as one or more vectors including a number of weight factors or parameter values.

In particular embodiments, the computing system 240, during training, may feed the past driving behavior data 241 of one or more nearby vehicles and the contextual data 243 of the surrounding environment related to the driving behavior data 241 to the prediction model 220B. In particular embodiments, the prediction model 220B may be a machine-learning (ML) model such as a neural network model including a number of weight factors and parameters to be adjusted during the training process. The prediction model 220B may process a training sample (e.g., including contextual data 243 and associated past driving behavior data 241) and output a prediction 247 of the driving behaviors of the nearby vehicles using the current values of the weight factors and parameters of the prediction model 220B. The predicted driving behaviors may be for a short period of time from the current time (e.g., 0.5 seconds or 2 seconds from current time). After the predicted driving behaviors 247 are determined, the computing system 240 may compare the predicted driving behavior 247 with the actual driving behavior data 245 associated with the training sample, which may be collected at a later time (e.g., 0.5 seconds later or 2 seconds later) to be used as the ground truth for assessing the correctness of the predicted driving behaviors 247. The difference 249 of the predicted driving behaviors 247 and the actual driving behavior data 245, which may be assessed using a loss function, may be fed back to the prediction model 220B via back propagation, causing the prediction model 220B to adjust the weight factors and parameter values accordingly. Training of the prediction model 220B may repeat in the same manner iteratively until a terminating condition is reached. The terminating condition may be satisfied when the difference/loss 249 between the predicting driving behavior 247 and the actual driving behavior 245 is sufficiently small (e.g., lower than a predetermined threshold).

In particular embodiments, the prediction model 220B and its training process may not be specific for any particular vehicles, any particular vehicle types, or any particular vehicle region. For example, the prediction model 220 may be trained using all driving behavior data collected by the fleet of vehicles and stored in the database 232. Once trained, the same prediction model 220B with the same set of parameters or coefficients may be distributed to each vehicle of a fleet of vehicles. For example, the prediction model parameters 234 of the prediction model 220B may be synchronized to the prediction model 220A hosted on the local computing system 210 of the vehicle. In particular embodiments, the prediction model 220 may be continuously fed with newly collected driving behavior data and contextual data and have one or more parameters or coefficients updated during the training process. The newly updated parameters or coefficients of the prediction model 220B may be synchronized to the prediction model 220A. In particular embodiments, the update or synchronization may be performed through wireless or wired data connections when the vehicles arrive at vehicle service centers. In particular embodiments, the update or synchronization may be performed through a wireless data connection while the vehicles drive around or stop at any suitable locations. In particular embodiments, the prediction model 220B may be trained in a local computing system 240 (in FIG. 2B) using real-time or semi-real-time driving behavior data and contextual data. In particular embodiments, the prediction models 220A and 220B may be or include a machine-learning (ML) model such as a neural network.

In particular embodiments, the prediction model 220 and its training process may not be specific for any individual vehicles but may be specific for a group of vehicles associated particular geographic regions (e.g., states, cities, towns, geographic areas, etc.). For example, the prediction model 220 may be trained by the driving behavior data and related contextual data of a number of vehicles associated with a particular geographic region (e.g., states, cities, towns, geographic areas, etc.). Different geographic regions may have different prediction models with different sets of parameter values as determined during the respective training processes. The prediction models may include information related to respective geographic regions that are associated with respective prediction models. The prediction models which are trained by vehicles of respective regions may be distributed or synchronized to a fleet of vehicles associated with those particular geographic regions. The fleet of vehicles in a particular geographic region may use the prediction model trained using the driving behavior data collected in this particular geographic region to predict the driving behavior of other vehicles driving in this geographic region.

In particular embodiments, the remote server computer 230 may include a prediction model database which may include a number of prediction models and corresponding sets of parameters. Each prediction model may be specific to a particular vehicle and may be trained by the historical driving data of that particular vehicle. Once trained, the prediction models together with corresponding parameters may be downloaded onto the database of the local computing systems of a fleet of vehicles. When a nearby vehicle is detected, the computing system may retrieve, from the local database, an individualized prediction model associated with the anonymous vehicle identifier of the nearby vehicle. The computing system may use the retrieved prediction model for predicting the driving behaviors and driving trajectories of the nearby vehicle and determine the vehicle operations based on the predicted driving behaviors and driving trajectories. The individualized prediction model may be used to predict the driving behaviors and trajectories of that particular vehicle only and may not be used to predict driving behaviors of any other vehicles or moving objects.

In particular embodiments, any updates to the vehicle model data 233 stored in the database 232 of the remote server computer 230 may be synchronized to the vehicle model database 204 on the local computing system 210 of each vehicle of a fleet of vehicles. As an example and not by way of limitation, the database 232 may be continuously updated with newly collected driving behavior data which is captured and uploaded by a fleet of vehicles. Each time the vehicle model data in the database 232 of the remote server computer 230 is updated with newly collected driving behavior data, the updated vehicle model data 233 may be synchronized to the local vehicle model database 204 of each vehicle of the fleet of vehicles. As another example, each time a new vehicle model is generated based on newly collected driving behavior data for a newly observed vehicle, the new vehicle model may be synchronized to the local vehicle model database 204 of each of the fleet vehicles. After receiving the updated vehicle model data, the fleet of vehicles may use the most up-to-date vehicle model data to predict the driving behaviors and trajectories of nearby vehicles.

After the prediction model 220B has been trained, it may be used by a vehicle's computing system 210 to predict behaviors of nearby vehicles. Referring again to FIG. 2A, the computing system 210 may use its sensors to collect vehicle data 211 related to one or more nearby vehicles and the contextual data 213 of the surrounding environment. In particular embodiments, the collected vehicle data 211 may include, for example, driving trajectories of the nearby vehicles, one or more vehicle images of a nearby vehicle (e.g., images from different view angles or different distances, images captured using different types of cameras). For example, the vehicle data 211 may include an image of a nearby vehicle captured from the front side, lateral side, back side or an arbitrary view angle of the nearby vehicle. As another example, the vehicle data 211 may include an image of the nearby vehicle captured by a common optical camera, a high-resolution camera, a stereo-camera pair, a thermal camera, etc. As another example, the vehicle data 211 may include sensor data of one or more sensors or sensing systems (e.g., radars or LiDARs). In particular embodiments, the vehicle data 211 may be fed to the feature extracting module 202 to determine one or more features 215 (e.g., an anonymous vehicle identifier, a vehicle type, a geographic region, a driving behavior) associated with the nearby vehicle. The feature extracting module 202 may use one or more types of computer vision technologies (e.g., optical character recognition (OCR), pattern recognition, agent classifiers, machine-learning-based feature recognition models, etc.) to extract or determine the features associated with the nearby vehicle. For example, the feature extracting module 202 may use OCR technology on an image of the nearby vehicle to identify one or more features 215 of the vehicle. The extracted features 215 may then be used to query for past driving behavior data associated with the nearby vehicles.

In particular embodiments, to protect drivers' privacy, the computing system 210 may generate an anonymous vehicle identifier for the nearby vehicle. In particular embodiments, the anonymous vehicle identifier may refer to an anonymous identifier associated with a license plate of a vehicle and could be used to uniquely identify the associated vehicle from a database in an anonymous way. In other words, the system may anonymously associate a vehicle to a set of historical driving behavior data in the database but is agnostic to any information related to actual identification of the vehicle or any related persons. In particular embodiments, the anonymous vehicle identifier may be associated with any features, attributes, or characteristics of the vehicle that can identify that vehicle and the anonymous vehicle identifier is not limited to license plate information. In particular embodiments, the anonymous vehicle identifier may include an encoded combination (e.g., hashed or encoded using a one-way encryption function) of characters and/or numbers including no information related to the actual license plate number or actual identification of the vehicle. In particular embodiments, the system may use the anonymous vehicle identifier associated to the license plate number to identify vehicle. The system may obfuscate or encode data related to the license plate number of the vehicle and make such data un-recognizable and non-identifiable by any human operators (e.g., system operators). Based on the anonymous vehicle identifier, the computing system 210 may query for the past driving behavior data associated with the nearby vehicle.

In particular embodiments, when individual data associated with the particular nearby vehicle is unavailable, the computing system 210 may instead use the vehicle's type to query for past driving behavior data associated with vehicles of that type. For example, the feature extracting module 202 to determine a vehicle type of the nearby vehicle based on the vehicle data 211. In particular embodiments, the feature extracting module 202 may include a machine-learning (ML) based classification model for classifying the vehicle based on the vehicle data 211. The ML-based classification model may be trained by historical vehicle data to classify vehicles into different categories or types. As an example and not by way of limitation, the ML-based classification model may classify vehicles into different types or sizes of the vehicles including, for example, but not limited to, small cars, middle-size cars, full-size cars, small-SUVs, large-SUVs, trucks, sport cars, minivans, bus, etc. As another example, the ML-based classification model may classify vehicles based on utility of the vehicles, for example, school buses, taxis, private vehicles, police vehicles, fire engines, commercial vehicles, rental vehicles, vehicles for training new drivers, etc. As another example, the ML-based classification model may classify vehicles based on autonomous features of vehicles, for example, human-driven vehicles, full autonomous vehicles, autonomous vehicles with safety drivers, human-machine hybrid driven vehicles, computer-assisted human-driven vehicles, etc. As another example, the ML-based classification model may classify vehicles based on the manufacturer or brands of the vehicles. As another example, the ML-based classification model may classify vehicles based on vehicle engine types or technologies, for example, gasoline-powered vehicles, electric vehicles, hybrid vehicles, hydrogen-powered vehicle, natural-gas-powered vehicles, diesel vehicles, etc. Since vehicles of the same type may have similar driving behavior, the system may use the determined vehicle type of the nearby vehicle to query for past driving behavior data associated with vehicles of that type.

In addition to vehicle type, geographic location associated with a vehicle may also be correlated with driving behavior. For example, vehicles from cities may drive differently than vehicles from urban areas, and vehicles from different states may also drive differently. Leveraging this observation, in particular embodiments, the system may use the feature extracting module 202 to determine a geographic region associated with a nearby vehicle. In particular embodiments, the geographic region associated with a nearby vehicle may correspond to a region where the vehicle is registered or a region where the vehicle is currently located. As an example and not by way of limitation, the system may determine a related state name from the license plate indicating where the vehicle is registered. As another example, the system may determine a geographic region (e.g., a city, a county, a town, a college, a university, a community, etc.) associated with the vehicle from a sticker (e.g., with regional entity names or signs) on the vehicle. As another example, the system may determine an associated geographic region (e.g., a city, a county, a town, a college, a university, a community, etc.) based on the current locations (e.g., GPS coordination) of the vehicles as observed by one or more members of a fleet of vehicles. As another example, the system may determine a geographic region (e.g., a city, a county, a town, a college, a university, a community, etc.) associated with the vehicle based on statistic data on vehicles having similar features (e.g., a particular vehicle type or brand is very popular in a particular geographic region). Based on the extracted features, the system may query for past driving behavior data associated with vehicles with the same features.

In particular embodiments, once the computing system 210 has extracted features associated with the nearby vehicle, the computing system 210 may query a vehicle model database 204 for past driving behavior data associated with vehicle(s) with such features. In particular embodiments, the framework 200 may include a vehicle model database 204 storing a number of vehicle models (e.g., individualized vehicle models, vehicle type models, vehicle region models). In particular embodiments, the computing system 210 may feed one or more features of the nearby vehicle as determined by the feature extracting module 202 to the vehicle model database 204 to retrieve the corresponding vehicle models. In particular embodiments, the vehicle models stored in the vehicle database 204 may be associated with one or more lookup tables which associate the vehicle features to the corresponding vehicle models. The computing system 210 may search the lookup tables based on the vehicle features and retrieve the corresponding vehicle models. The computing system 210 may first search the vehicle model database 204 based on the anonymous vehicle identifier of the nearby vehicle. When the individualized vehicle model corresponding to that anonymous vehicle identifier is found in the database 204, the computing system 210 may retrieve the corresponding individualized vehicle model. It is notable that individualized vehicle models and the anonymous vehicle identifiers as described here are optional for the computing system 210 to predict the driving behaviors of nearby vehicles. When the corresponding individualized vehicle model cannot be found in the vehicle model database 204, the computing system 210 may search the vehicle model database 204 based on the vehicle type. When the corresponding vehicle type model is found in the vehicle model database 204, the computing system 210 may retrieve the vehicle type model. When the corresponding vehicle type model is not found in the vehicle database 204, the computing system 210 may search the database 204 based on a geographic region associated with the vehicle. When the vehicle region model is found in the database 204, the computing system 210 may retrieve the vehicle region model from the database 204.

In particular embodiments, the computing system 210 may identify a nearby vehicle (e.g., through an anonymous vehicle identifier) which is associated with a particular driving behavior. The computing system may retrieve the corresponding vehicle model for that particular driving behavior for predicting the driving behavior of that nearby vehicle. In particular embodiments, when a nearby vehicle is observed to have a particular driving behavior, the computing system 210 may retrieve the vehicle model associated with that particular driving behavior from a vehicle model database and use the retrieved vehicle model to predict the driving behaviors of the nearby vehicle (without identifying that vehicle by the anonymous vehicle identifier or using an individualized vehicle model). It is notable that the computing system 210 may search and try to retrieve the vehicle models from the database 204 based on features of the vehicle in any order. For example, when the individualized vehicle model is not found in the vehicle database, the computing system 210 may first search and try to retrieve vehicle model from the vehicle model database 204 using the vehicle type before using the vehicle region. As another example, when the individualized vehicle model is not found, the computing system 210 may first search and try to retrieve vehicle model from the vehicle model database 204 using the vehicle region before using the vehicle type. In particular embodiments, when none of the individualized vehicle model, the vehicle type model, the vehicle region model, or the vehicle model associated with particular driving behaviors is found in the vehicle model database 204, the computing system 210 may retrieve and use a general vehicle model for predicting the driving behaviors. The general vehicle model may be determined based on an average or weighted average of a number of individualized vehicle models, vehicle type models, and/or vehicle region models. In this disclosure, the vehicle models (e.g., individualized vehicle models, vehicle type models, vehicle region models, vehicle models associated with particular driving behaviors) may also be referred to as the driving behavior models and the vehicle model database may also be referred to as the driving behavior model database.

In particular embodiments, the computing system 210 may use one or more sensing systems to monitor the surrounding environment and identify one or more vehicles of interest among the nearby vehicles and predict the driving behavior of the identified vehicle(s) of interest. As an example and not by way of limitation, a vehicle of interest could be a nearby vehicle within a threshold distance to the ego vehicle. In this disclosure, the ego vehicle may refer to a vehicle which uses the systems and methods described in this disclosure to predict driving behaviors of nearby vehicles. As another example, a vehicle of interest could be a vehicle within the detectable range of the ego vehicle's sensing systems (e.g., cameras, sensors, radars, LiDARs, etc.). As another example, a vehicle of interest could be a vehicle whose driving trajectory may intersect the driving trajectory of the ego vehicle or may be close to the driving trajectory of the ego vehicle. As another example, a vehicle of interest could be a vehicle whose driving behavior deviates from normal driving behaviors (e.g., driving at unusually high speeds, driving with unusual trajectories, etc.). As another example, a vehicle of interest could be a nearby vehicle which may directly or indirectly affect the driving operation of the ego vehicle.

In particular embodiments, the computing system 210 may feed the historical driving behavior data 217 included in the retrieved vehicle models to the prediction model for predicting driving behaviors of the vehicle of interest. In particular embodiments, the prediction model 220A may include a machine-learning (ML) model which was trained to predict future driving behaviors. In particular embodiments, the computing system 210 may use the prediction model 220A to predict driving behaviors of a vehicle of interest based on the historical driving behavior data and current contextual data of the vehicle of interest. The predicted driving behaviors may include, for example, but are not limited to, failing to turn on turning signals before making a turn, failing to turn with turning signals flashing, switching lines without turning on signals, weaving in and out traffic, driving in zigzag patterns, speeding, harsh accelerating, harsh braking, failing to stop at stop signs, failing to yield, violating right of way, following other vehicles too close (e.g., failing to maintain a safe following distance), ignoring traffic signals, passing within non-passing zones, etc. In particular embodiments, the predicted driving behaviors may include or be associated with one or more possible driving trajectories of the vehicle.

In particular embodiments, the computing system 210 may predict the likelihood of one or more driving behaviors based on the historical driving behavior data related to the vehicle of interest and the current contextual data of the surrounding environment. The computing system 210 may determine a possibility score (e.g., possibility percentage) for the chance of a predicted driving behavior. The computing system 210 may compare the possibility percentage value to a threshold value. The computing system 210 may determine that the predicted driving behavior is likely to happen when the percentage value is above the threshold. The computing system 210 may determine that the driving behavior is unlikely to happen when the percentage value is below the threshold. The predicted driving behaviors of the vehicle of interest may be determined based on the historical driving behavior data associated with an individualized vehicle model, a vehicle type model, a vehicle region model, or a general vehicle model, etc. In particular embodiments, the computing system 210 may predict the driving behaviors of the vehicle of interest for a short period future time (e.g., 0.5 seconds, 2 seconds) from the current time. After the predicted driving behaviors have been determined, the system may use the planning module 206 to determine or select vehicle operations based on the predicted driving behaviors of the nearby vehicles, as will be described in detail in later sections.

In particular embodiments, the system may determine or select vehicle operations (e.g., using the planning module) based on the predicted driving behaviors and trajectories of the nearby vehicles. In particular embodiments, the system may generate or retrieve from a vehicle operation database a number of vehicle operation plans. The system may determine a score for each of the generated or retrieved vehicle operation plans in view of the current situation (e.g., as determined based on the predicted driving behaviors and trajectories of other vehicles and contextual data of the surrounding environment). The system may rank all possible vehicle operations under the current situation based on the corresponding scores and select the vehicle operation with the highest score. In particular embodiments, the system may generate a new vehicle operation plan based on the predicted driving behaviors of other vehicles and contextual data of the environment. The newly generated vehicle plan or vehicle operation may have a higher score than other stored vehicle operation plans under this situation. In particular embodiments, the system may select or generate a vehicle operation based at least on the possibility scores of one or more predicted driving behaviors. For example, the system may delay an acceleration operation and yield the right of way when the nearby vehicle is predicted to have a 30% chance to fail to stop at the four-way stop intersection. In particular embodiments, the system may execute a vehicle operation plan when the score of the vehicle operation is above a score threshold. As a result, vehicle planning and operation will be greatly improved by determining vehicle operations based on more accurately predicted driving behaviors and trajectories of other vehicles.

In particular embodiments, the vehicle operations may include, for example, but are not limited to, delaying a vehicle acceleration operation for a period of time, executing a vehicle acceleration operation ahead of a previously planned time, executing a speed reduction operation, increasing a distance to the vehicle of interest, adopting a new moving path or trajectory, keeping a distance to the vehicle of interest being above a threshold distance, yielding the right of way, stopping the vehicle, sending warning signals to other vehicles, sending warning signals to a driver of the vehicle, allocating more sensing resources (e.g., more sensors, more bandwidth, higher framerate) for monitoring a vehicle of interest, switching driving lanes, avoiding to intersect with a predicted driving trajectory of the vehicle of interest, etc.

In particular embodiments, the vehicle specification information may be used for improving the confidence and precision of the vehicle system's perception with respect to the surrounding environment. In particular embodiments, the vehicle system may determine (e.g., based on an anonymous identifier or one or more anonymous features) that a nearby vehicle is associated with an individualized driving behavior model or a vehicle type-based driving behavior model. The vehicle system may retrieve from the database the corresponding specification information associated with that individualized driving behavior model or vehicle type-based driving behavior model. The vehicle system may determine the length, width, and height of the nearby vehicle based on the retrieved specification information. The vehicle system may determine a bounding box representing the size and shape of the vehicle for the nearby vehicle with an improved accuracy and precision by accurately knowing the nearby vehicle's length, width, and height (instead of relying on the particular sensor feedback alone for the vehicle).

In particular embodiments, the vehicle system may directly determine specification information of a nearby vehicle based on vehicle images or any suitable sensor data (e.g., point of cloud from a LiDAR system, radar data, etc.) of that nearby vehicle. The vehicle system may determine the specification information of the nearby vehicle based on one or more features (e.g., a vehicle shape, a body part, a bumper, a head light, a corner, a logo, a back profile, a side profile, a blurred profile, a front profile, a window shape, a vehicle shape, a text indicator, a sign, etc.) associated with that vehicle. In particular embodiments, the vehicle system may use a computer vision algorithm or a machine-learning (ML) model to determine the vehicle manufacturer, type, and model based on an image including at least a part of the vehicle. For example, the vehicle system may capture an image including the bumper of a nearby truck, determine the truck's manufacturer, type, and model based on that bumper image, and determine the specification information (e.g., a length, a width, a height, a weight, etc.) based on the truck's manufacturer and model. As another example, the vehicle system may use a computer vision algorithm or a machine-learning (ML) model to recognize a vehicle manufacturer and model based on an image including a side profile of that vehicle and determine the vehicle specification information.

In particular embodiments, the vehicle specification information may be used for more accurate prediction of the driving behavior of nearby vehicles and better determination of vehicle operations during the planning process. In particular embodiments, the vehicle system may use a computer vision algorithm or a machine-learning (ML) model to recognize a vehicle type or model from an image including only a part of that vehicle (e.g., a body part, a bumper, a head light, a corner, a logo, a back/side/front profile, a window, a text indicator, a sign, etc.) and determine the corresponding specification information of that particular vehicle based on the vehicle type or model. In particular embodiments, the vehicle system may determine the specification information of a nearby vehicle based on the stored specification data of an associated driving behavior model. In particular embodiments, when other information about a nearby vehicle is not available, the vehicle system may generate perception of that nearby vehicle based on its specification information to understand the type and/or footprint of that nearby vehicle.

In particular embodiments, the vehicle system may use the specification information of the nearby vehicle to predict the driving behavior of that vehicle with an improved accuracy and precision. As an example and not by way of limitation, the vehicle system may determine that a nearby truck's length is much longer than usual trucks. The system may predict that that nearby truck may need a longer time for making a turn at the approaching intersection and may take that factor into consideration when planning the vehicle moving path and acceleration operations (e.g., planning a moving path and/or an acceleration envelope which allow a longer waiting time for the nearby truck to make a turn). As another example, the vehicle system may determine that a nearby vehicle's weight is much greater than usual vehicles and may predict that that nearby vehicle will have a slow acceleration process after a stop and may take that factor into consideration when planning vehicle moving path and acceleration operations (e.g., planning a slower acceleration process when following that vehicle). As another example, the vehicle system may predict an acceleration envelope for a nearby vehicle based on that vehicle's length, weight and horsepower information (e.g., extracted from text indicators of vehicle images) and may plan a moving path and/or an acceleration envelope for the vehicle based on the predicted acceleration envelope of the nearby vehicle to void any intersections. As another example, the vehicle system may predict a series of future positions for a nearby vehicle based on a predicted speed curve and acceleration envelope calculated based on the specification information of that vehicle, and plan the vehicle's moving path and acceleration operations based on the predicted future position of the nearby vehicle. As a result, by determining and taking into consideration of the specification information of the nearby vehicles, the vehicle system may have more accurate and precise prediction on the driving behavior of the nearby vehicle (e.g., speeds, locations, moving paths, etc.) and better determination on planning operations, and therefore improve the safety and efficiency of the vehicle's planned travel path.

In particular embodiments, the system may make appropriate operational decisions based on features or characteristics associated with various types of moving entities or agents (e.g., motorcycles, electric bikes, bikes, pedestrians, scooters, etc.) in one or more geographic regions. The system may use sensors, radars, and/or LiDARs to detect one or more moving entities or agents (e.g., motorcycles, electric bikes, bikes, pedestrians, scooters, etc.) the surrounding environment of the vehicle and identify one or more features or characteristics of these moving entities or agents of corresponding geographic regions. As an example and not by way of limitation, the system may identify that a particular block of a city has a high pedestrian density and may slow down the driving speed when passing through that city block. As another example, the system may identify that a particular route of a city has large number of motorcycles driving aggressively at high speeds and may avoid that route when planning routes for the vehicle or may slow down the driving speed when driving on that road. As another example, the system may identify that a particular downtown area of a city has a large number of scooter riders with unpredictable moving paths. The system may avoid that area when planning routes for the vehicle or slow down the driving speed when driving in that area. It is notable that the system identify the features and characteristics of the moving entities or agents in an anonymous way. In other words, the system may only identify the types of the moving entities or agents and does not identify or collect data about any particular moving entities or agents.

Figure 3A:
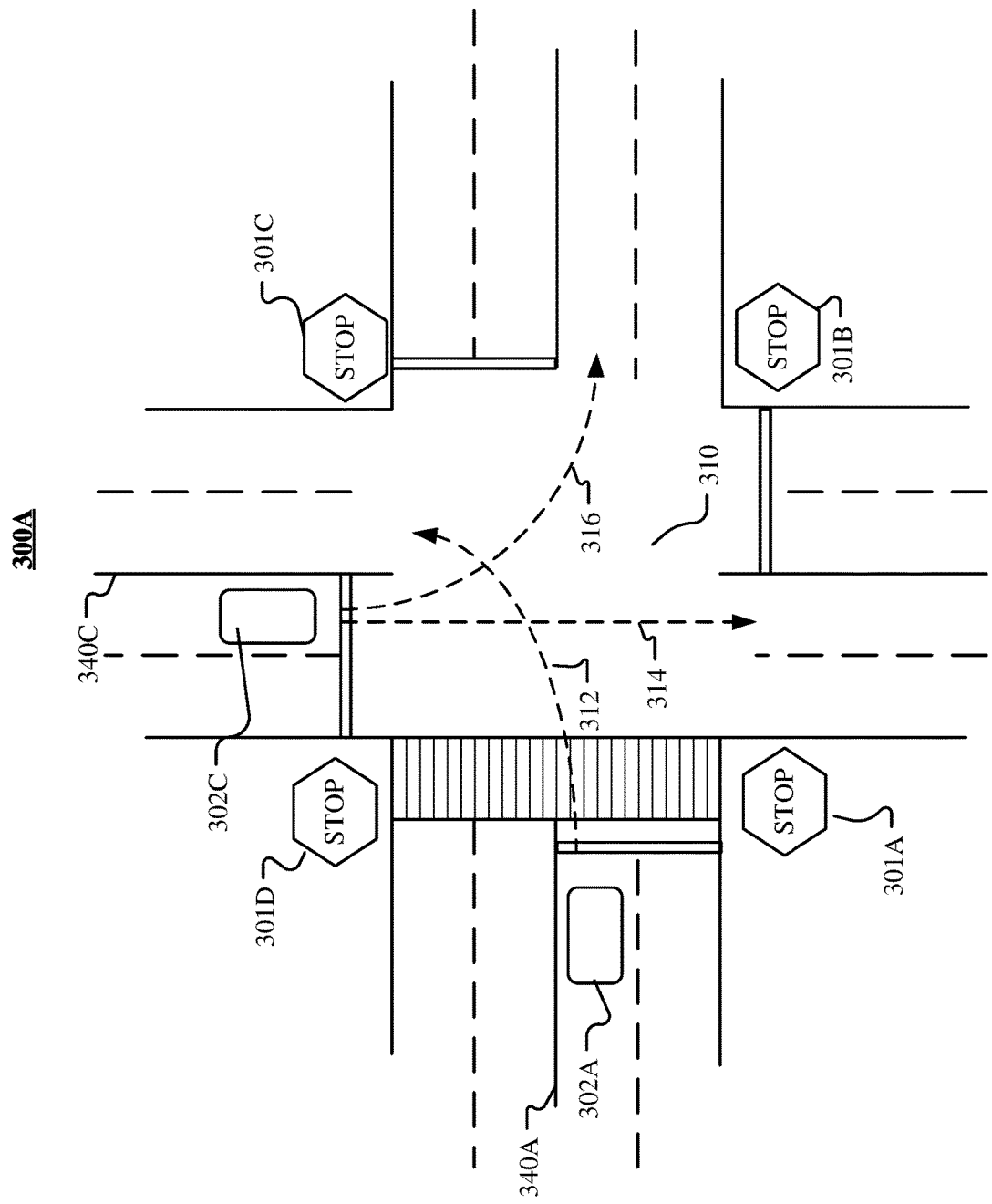
FIGS. 3A-3C illustrate example situations for determining vehicle operations based on predicted driving behaviors and trajectories of a nearby vehicle.
Figure 3B:
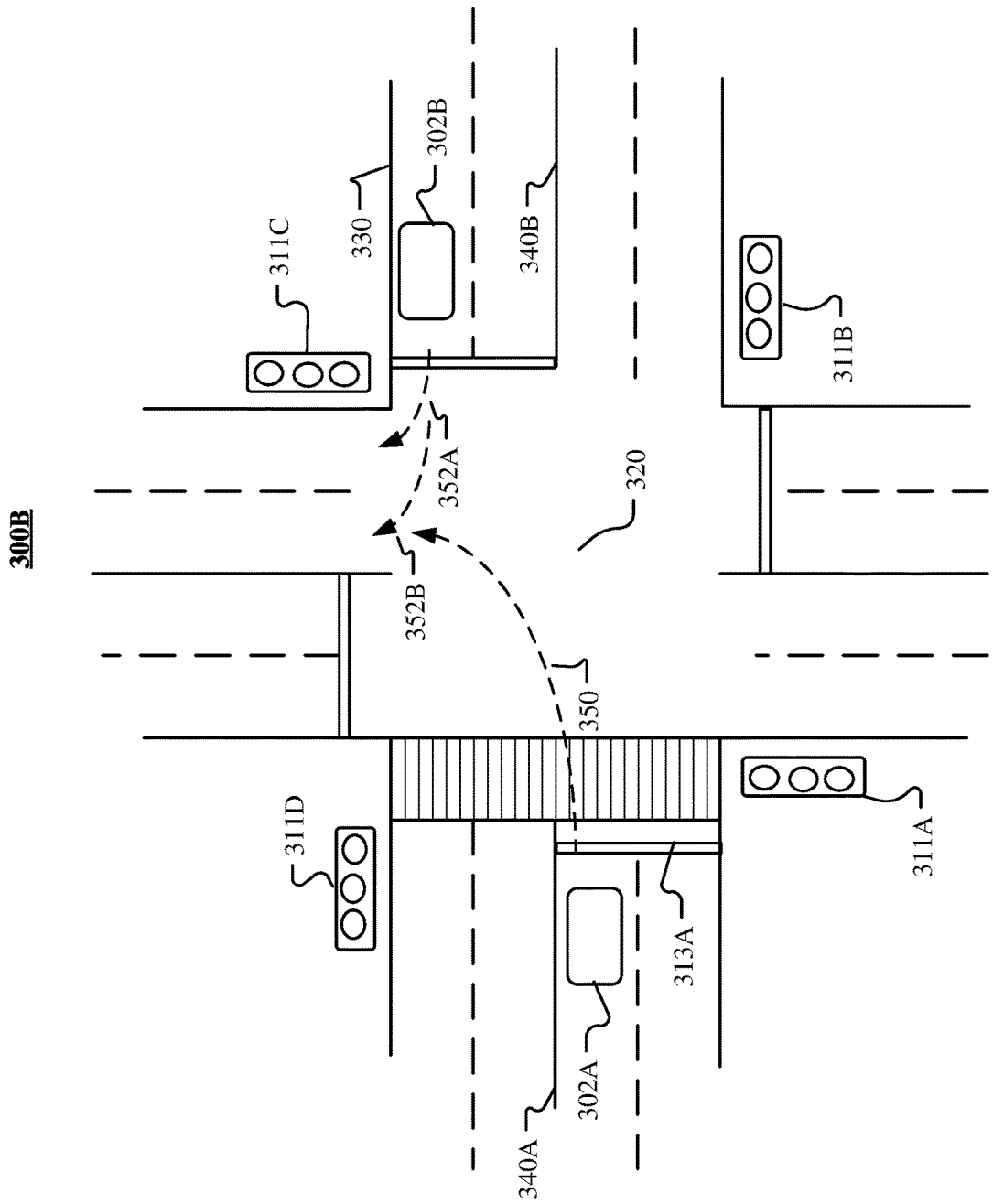
Figure 3C:
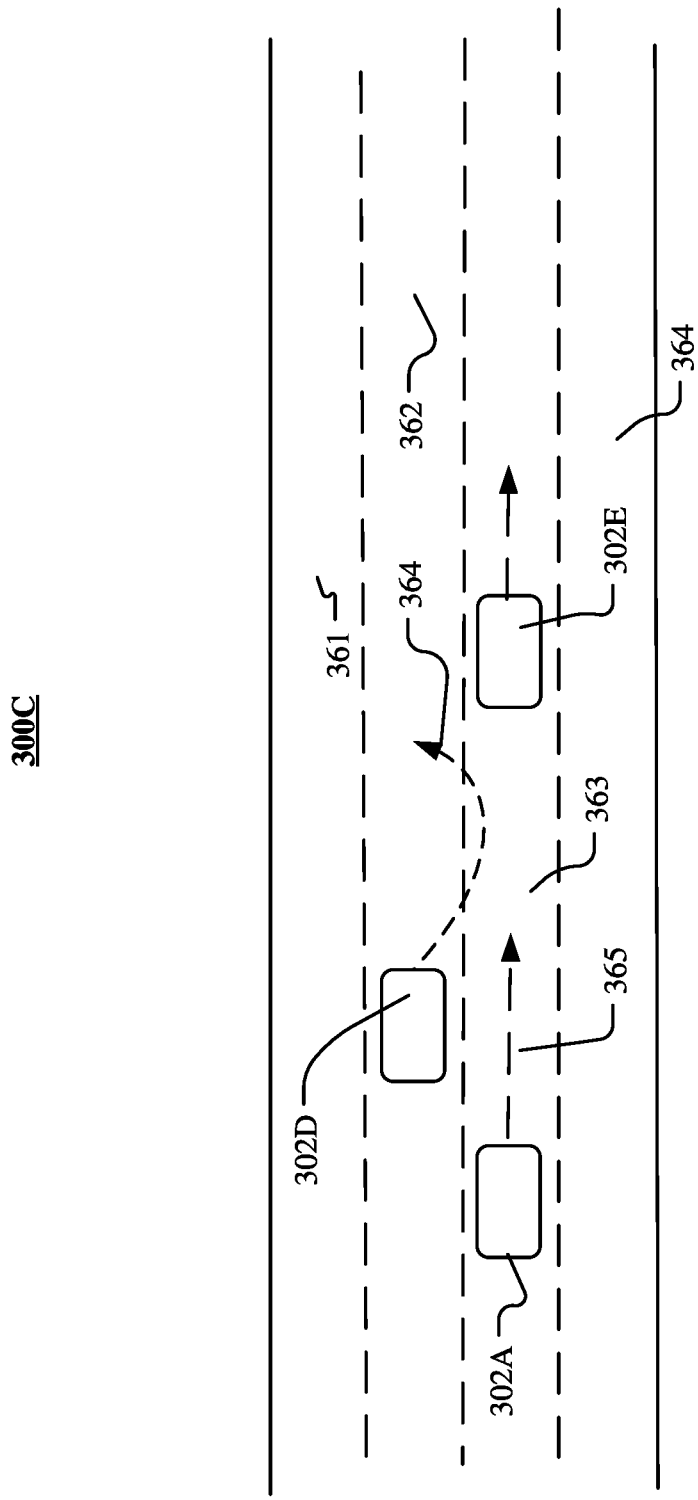

FIGS. 3A-3C illustrate example situations for determining vehicle operations based on predicted driving behaviors and trajectories of a nearby vehicle. FIG. 3A illustrates an example situation 300A for determining vehicle operations based on predicted driving behaviors and trajectories of a nearby vehicle 302C. As an example and not by way of limitation, the vehicle 302A may stop at an intersection 310 with four-way stop signs (e.g., 301A-D). The vehicle 302A may plan to make a left turn along the driving trajectory 312. Another vehicle 302C may be approaching the same intersection 310 from another direction 340C. The vehicle 302A may use the systems and methods as described in this disclosure to predict the driving behaviors and trajectories of the vehicle 302C. The system may identify an anonymous vehicle identifier associated with the vehicle 302C. The system may retrieve from a vehicle model database an individualized vehicle model for the vehicle 302C with the historical driving behavior data of the vehicle 302C. The historical driving behavior data may indicate that the vehicle 302C had failed to stop at four-way stop intersections. The system may determine that there is a 30% chance that the vehicle 302C will fail to stop at the stop sign 301D based on the historical driving behaviors of the vehicle 302C. The system may further measure the speed of the vehicle 302C and the distance of the vehicle 302C to the intersection 310 while the vehicle 302C is approaching the intersection 310. The system may determine that there is a 60% chance that the vehicle 302C will fail to stop at the stop sign 301D because the vehicle 302C maintains a relative high speed (e.g., above a threshold speed) when the distance to the intersection 310 is quite small (e.g., below a threshold distance). The system may determine that the vehicle 302C may drive along the predicted driving trajectory of 314 or 316 intersecting the driving trajectory 312 of the vehicle 302A. Based on the predicted driving behavior and trajectories of the vehicle 302C, the system may determine to wait at the stop sign 301A and allow the vehicle 302C to pass the intersection 310 (e.g., along the driving trajectory 314 or 316) although the vehicle 302A arrived at the intersection 310 later than vehicle 302A. As a result, the vehicle safety of the vehicle 302A is greatly improved by avoiding potential collisions with the vehicle 302C.

FIG. 3B illustrates another example situation 300B for determining vehicle operations based on predicted driving behaviors and trajectories of a nearby vehicle 302B. As an example and not by way of limitation, the vehicle 302A may stop at an intersection 320 with four-way traffic signs (e.g., 311A-D). The vehicle 302A may plan to make a left turn along the driving trajectory 350. Another vehicle 302B may be approaching the same intersection 320 from another direction 340B. The vehicle 302A may use the systems and methods as described in this disclosure to predict the driving behaviors and trajectories of the vehicle 302B. The system may identify an anonymous vehicle identifier associated with the vehicle 302C. The system may retrieve an individualized vehicle model for the vehicle 302B including the historical driving behavior data of the vehicle 302B. The historical driving behavior data may indicate that the vehicle 302B had made many right turns on red without using the turning lights. The system may determine that there is a 30% chance that the vehicle 302B will turn to the right along the trajectory 352A or 352B even though the turning lights of the vehicle 302B are not flashing. The system may further determine that the intersection 320 does allow a right turn on red. The system may determine that there is a 60% chance that the vehicle 302B will make a right turn. The system may predict that the vehicle 302B may drive along the trajectory 352A or trajectory 352B without a full stop before making the right turn. Based on the predicted driving behavior of the vehicle 302B, the system may determine to (1) wait at the stop sign 313A and allow the vehicle 302B to pass the intersection 310 although the traffic signals for vehicle 302A to make a left turn along the trajectory 350 is green; or (2) slow down during the turning process along the driving trajectory 350 to allow the vehicle 302B to make the turn first. As a result, the vehicle safety of the vehicle 302A is greatly improved by avoiding potential collisions with the vehicle 302B.

FIG. 3C illustrates another example situation 300C for determining vehicle operation based on predicted driving behaviors and trajectories of nearby vehicles (e.g., 302D and 302E). As an example and not by way of limitation, the vehicle 302A may drive in the lane 363 of a four-lane highway (e.g., lanes 361, 362, 363, 364) with a second vehicle 302E driving in the same lane 363 and a third vehicle 302D driving in another lane 362. The vehicle 302A may use the systems and methods as described in this disclosure to predict the driving behaviors of the vehicles 302D and 302E. The system may identify an anonymous vehicle identifier associated with the vehicle 302D. The system may retrieve an individualized vehicle model for the vehicle 302D which includes the historical driving behavior data of the vehicle 302D. The historical driving behavior data may indicate that the vehicle 302D had driving behaviors of weaving in and out of traffic, switching lanes without using turning lights, and/or driving in zigzag patterns. The system may determine that there is a 30% chance that the vehicle 302D will weave in the lane 363 even though the turning lights of the vehicle 302D are not flashing. The system may predict that the vehicle 302D will weave in and out the line 363 along the predicted driving trajectory 364 which may intersect the driving trajectory 365 of the vehicle 302A. Based on the predicted driving behavior and trajectory of the vehicle 302D, the vehicle 302A may determine to (1) reduce the driving speed to increase the distance to the vehicle 302D; or (2) switch to another lane (e.g., 364) to avoid intersecting with a predicted driving trajectory of the vehicle 302D. As a result, the vehicle safety of the vehicle 302A is greatly improved by avoiding potential collisions with the vehicle 302D.

As an example and not by way of limitation, the system may identify an anonymous vehicle identifier associated with the vehicle 302E. The system may retrieve an individualized vehicle model for the vehicle 302E which includes the historical driving behavior data of the vehicle 302E. The historical driving behavior data may indicate that the vehicle 302E had driving behaviors of harsh accelerating or harsh braking. The system may determine that there is a 20% chance that the vehicle 302E will have harsh braking without any warning. Based on the predicted driving behavior of the vehicle 302E, the vehicle 302A may determine to (1) reduce the driving speed to increase the distance to the vehicle 302E; or (2) switch to another lane (e.g., 364 or 362) to keep a safety distance to the vehicle 302E. As a result, the vehicle safety of the vehicle 302A is greatly improved by avoiding potential collisions with the vehicle 302E.

In particular embodiments, the system may use an individualized vehicle model for predicting driving behaviors and trajectories of nearby vehicles. As an example and not by way of limitation, the system may retrieve an individualized vehicle model for a nearby vehicle. The individualized vehicle model may include historical driving behavior data which indicates that the nearby vehicle had failed to turn on turning signals before making a turn. The system may predict that there is a 40% chance that the nearby vehicle will likely to make a turn since it is approaching an intersection with reduced speed even though it did not turn on its turning lights. The system may select a routing path or driving trajectory which has no intersection to the predicted turning trajectory of the nearby vehicle. As another example and not by way of limitation, the system may retrieve an individualized vehicle model or a vehicle type model for a nearby vehicle. The individualized vehicle model or vehicle type model may include historical driving behavior data which indicates that the nearby vehicle had driving behaviors such as switching lanes without turning on signals, weaving in and out of traffic, or driving in zigzag patterns. The system may predict that there is a 35% chance that the nearby vehicle will likely weave back to the traffic after it weaves out of the traffic. The system may change the driving lane to avoid intersection to the predicted driving trajectory of the nearby vehicle.

It is notable that, in some embodiments, the system may not need to use the anonymous vehicle identifier and individualized vehicle models. As an example and not by way of limitation, the system may retrieve, for a nearby vehicle, a vehicle type model, a vehicle region model, or a vehicle model associated with particular driving behavior for predicting the driving behaviors and trajectories of nearby vehicles. The vehicle model may include historical driving behavior data which indicates that the nearby vehicle had driving behaviors of speeding, harsh accelerating, harsh braking, etc. The system may predict that there is a 30% chance that the nearby vehicle will be likely to have hard accelerating or hard braking. The system may slow down the vehicle speed to increase the distance to the nearby vehicle and keep the distance above a threshold safe distance. As another example and not by way of limitation, the system may retrieve, for a nearby vehicle, a vehicle type model, a vehicle region model, or a vehicle model associated with a particular driving behavior for predicting the driving behaviors and trajectories of nearby vehicles. The vehicle model may include historical driving behavior data which indicates that the nearby vehicle had driving behaviors related to failing to stop at stop signs, failing to yield, violating right of way, etc. The system may predict that there is a 50% chance that the nearby vehicle will likely to fail to yield the right of way. The system may increase or slow down the vehicle speed to keep the distance to the nearby vehicle above a safety distance.

As another example and not by way of limitation, the system may retrieve, for a nearby vehicle, a vehicle type model, a vehicle region model, or a vehicle model associated with a particular driving behavior. The vehicle model may include historical driving behavior data which indicates that the nearby vehicle had driving behavior of following other vehicles with very short following distance. The system may predict that there is a 60% chance that the nearby vehicle will be likely to follow the vehicle too closely. The system may increase the vehicle speed to keep the distance to the nearby vehicle above a safety distance or may change the driving lane to drive in a different lane. As another example and not by way of limitation, the system may retrieve, for a nearby vehicle, a vehicle type model, a vehicle region model, or a vehicle model associated with a particular driving behavior. The vehicle model may include historical driving behavior data which indicates that the nearby vehicle had driving behavior of ignoring traffic signals. The system may predict that there is a 20% chance that the nearby vehicle will likely to rush through the intersection with a yellow or red signal. The system may adjust the vehicle speed to avoid intersecting with the predicted driving trajectory of the nearby vehicle or may yield the right of way to the nearby vehicle.

As another example and not by way of limitation, the system may retrieve, for a nearby vehicle, a vehicle type model, a vehicle region model or a vehicle model associated with a particular driving behavior. The vehicle model may include historical driving behavior data which indicates that the nearby vehicle had driving behavior of passing within non-passing zones. The system may predict that there is a 20% chance that the nearby vehicle will likely to pass another vehicle. The system may adjust the vehicle speed to increase the distance to that nearby vehicle. It is notable that the above threshold values for determining vehicle operations are for example purpose only and are not limited thereof. The threshold value may be any suitable predetermined values (e.g., by the vehicle systems or human experts) or dynamically determined values by a machine-learning-based threshold model.

Figure 4:
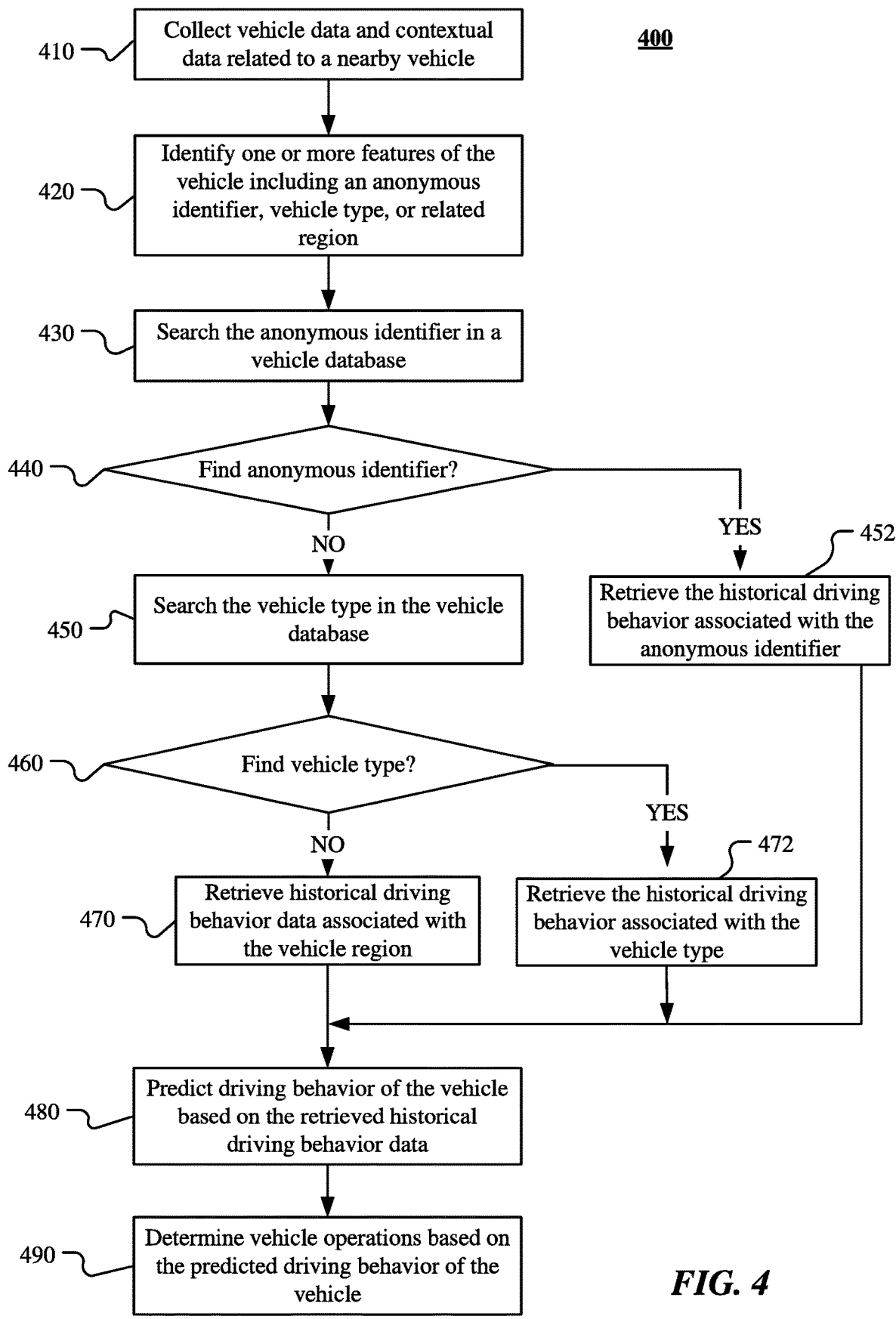
FIG. 4 illustrates an example method of determining vehicle operations based on predicted driving behaviors of a nearby vehicle.

FIG. 4 illustrates an example method 400 of determining vehicle operations based on predicted driving behaviors of a nearby vehicle. At step 410, the vehicle system may collect vehicle data related to a vehicle of interest and contextual data of the surrounding environment of the vehicle of interest using one or more sensors associated with the vehicle system. At step 420, the vehicle system may identify one or more features of the vehicle of interest. In particular embodiments, the identified features may be anonymous features including, for example, but not limited to, an anonymous vehicle identifier, a vehicle type, a related geographic region, a driving behavior, etc. In particular embodiments, the vehicle system may determine a vehicle behavior model for the vehicle of interest based on the identified features associated with the vehicle of interest. At step 430, the vehicle system may search the anonymous vehicle identifier in a vehicle model database. At step 440, the vehicle system may determine whether the anonymous vehicle identifier is found in the vehicle model database. At step 452, when the anonymous vehicle identifier is found in the vehicle model database, the vehicle system may retrieve an individualized vehicle model including historical driving behavior data associated with the anonymous vehicle identifier. At step 450, when the anonymous vehicle identifier is not found in the vehicle database, the vehicle system may search the vehicle type of the vehicle of interest in the vehicle model database. At step 460, the system may determine whether the vehicle type of the vehicle of interest is found in the vehicle model database. At step 472, when the vehicle type is found in the vehicle database, the vehicle system may retrieve a vehicle type model including historical driving behavior data associated with that type of vehicle. At step 470, when the vehicle type is not found in the vehicle database, the vehicle system may retrieve a vehicle region model including historical driving behavior data associated with vehicles associated with a geographic region. At step 480, the vehicle system may use the determined or retrieved vehicle model (e.g., an individualized vehicle model, a vehicle type model, or a vehicle region model) and the contextual data of the surrounding environment to predict the driving behavior of the vehicle of interest. At step 490, the vehicle system may determine one or more vehicle operations based on the predicted driving behaviors of the vehicle of interest and the contextual data of the surrounding environment.

In particular embodiments, a computing system of a vehicle may capture, using one or more sensors of the vehicle, sensor data associated with a first vehicle of interest. The computing system may identify one or more features associated with the first vehicle of interest based on the sensor data. The computing system may determine (e.g., retrieving from a vehicle model database) a driving behavior model associated with the first vehicle of interest based on the one or more features of the first vehicle of interest. The computing system may predict a driving behavior of the first vehicle of interest based on at least the determined driving behavior model. The computing system may determine a vehicle operation for the vehicle based on at least the predicted driving behavior of the first vehicle of interest. In particular embodiments, the one or more features associated with the first vehicle of interest may identify an anonymous identifier of the first vehicle of interest and the determined (e.g., retrieved from a vehicle model database) driving behavior model may be an individualized model associated with the anonymous identifier of the first vehicle of interest. The anonymous identifier may be generated based on a license plate of the first vehicle of interest or any other identifiable features, attributes, or characteristics of the first vehicle. The individualized model may be generated based on perceived driving behaviors associated with the first vehicle of interest.

In particular embodiments, the one or more features of the first vehicle of interest may identify a vehicle type of the first vehicle of interest. The determined driving behavior model may be specific to the vehicle type of the first vehicle of interest. The driving behavior model specific to the vehicle type may be determined based on perceived driving behaviors of a number of vehicles of the vehicle type. In particular embodiments, the one or more features of the first vehicle of interest may identify a geographic region associated with the first vehicle of interest. The determined driving behavior model may be specific to the geographic region associated with the first vehicle of interest. The driving behavior model specific to the geographic region may be determined based on historical perceived driving behaviors of a number of vehicles associated with the geographic region. The predicting the driving behavior of the first vehicle of interest may further include applying the driving behavior model and contextual information about the first vehicle of interest to a machine-learning model configured to predict vehicle behaviors.

In particular embodiments, the driving behavior model may be determined or retrieved from a database that may include a number of driving behavior models associated with a number of vehicles. Each of the driving behavior models may be determined based on historical driving behavior data of associated vehicles. The historical driving behavior data may be captured using sensors of a fleet of vehicles. In particular embodiments, the vehicle system may determine specification information of the first vehicle of interest based on an image including at least a part of the first vehicle and predict the driving behavior of the first vehicle of interest based on the specification information of the first vehicle. The vehicle specification information may include, for example, but are not limited to, one or more dimensions (e.g., length, width, height), a vehicle weight, one or more performance parameters, etc. The vehicle system may determine a bounding box for the first vehicle of interest based on the specification information. The vehicle system may predict the driving behavior of the first vehicle of interest based at least on the bounding box of the first vehicle of interest. In particular embodiments, the vehicle system may predict a future location of the first vehicle of interest based on the bounding box and/or the specification information of the first vehicle of interest and determine the vehicle operation based on the predicted future location of the first vehicle of interest. In particular embodiments, the vehicle system may determine a first acceleration envelope for the first vehicle of interest based on the vehicle weight and the one or more performance parameters of the first vehicle of interest. The vehicle system may determine a predicted moving path for the first vehicle of interest based on the first acceleration envelope of the first vehicle of interest. In particular embodiments, the vehicle operation may be determined based on at least a likelihood of the predicted driving behavior occurring. In particular embodiments, the computing system may determine, using the one or more sensors of the vehicle, contextual data of surrounding environment and predicting of the driving behavior of the first vehicle of interest may be based on at least the contextual data of the surrounding environment.

In particular embodiments, the determining a vehicle operation may include determining scores for a number of potential vehicle operations and selecting the vehicle operation from the potential vehicle operations based at least on the scores. The scoring may be based on optimization of a number of different factors including a probability of collision of the potential trajectory with any objects in the environment, comfort for a passenger in the vehicle, elegance or natural feel of the trajectory or operation on passengers, fuel or energy efficiency of the operation, speed and/or impact on travel time to a destination of the operation, etc. In some embodiments, the scoring may include safety considerations directly and/or any paths that would lead to any safety concerns may be filtered from consideration without being directly implicated in the scoring function. In particular embodiments, the vehicle operations may include, for example, but are not limited to, delaying a vehicle acceleration operation for a period of time, executing a vehicle acceleration operation ahead of a previously planned time, executing a speed reduction operation, increasing a distance to the first vehicle of interest, adopting a new moving path, keeping a distance to the first vehicle of interest above a threshold distance, yielding a right of way, sending warning signals to the first vehicle of interest, sending warning signals to a driver of the vehicle, allocating more sensing resources for monitoring the first vehicle of interest, switching driving lanes, avoiding to intersect with a predicted driving trajectory of the first vehicle of interest, etc. In particular embodiments, the computing system may detect, based on the sensor data, an opt-out indicator associated with the first vehicle of interest and exclude, in response to the detected opt-out indicator, the first vehicle of interest from a data collection process for collecting driving behavior data related to the first vehicle of interest.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for determining vehicle operations based on predicted driving behaviors of a nearby vehicle including the particular steps of the method of FIG. 4, this disclosure contemplates any suitable method for determining vehicle operations based on predicted driving behaviors of a nearby vehicle including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

In particular embodiments, the system may collect data of the vehicle, the nearby vehicles, and the surrounding environment from one or more hardware systems including, for example, but not limited to, cameras (e.g., optical camera, thermal cameras), LiDARs, radars, speed sensors, steering angle sensors, braking pressure sensors, a GPS, inertial measurement units (IMUs), acceleration sensors, etc. In particular embodiments, the system may temporarily store data using one or more data collection devices (e.g., an onboard data collection device, a mobile phone, a tablet, a mobile computer, an on-board computer, a high-performance computer, etc.) and upload the collected data to a server computer at vehicle service centers. In particular embodiments, the system may upload a portion of collected data or all the collected data to a remote server computer during the data collection process (e.g., through a wireless connection). As an example and not by way of limitation, the system may use a data collection device installed on the vehicle to collect and/or temporarily store data related to the vehicle, the nearby vehicles, and the surrounding environment.

Figure 5A:
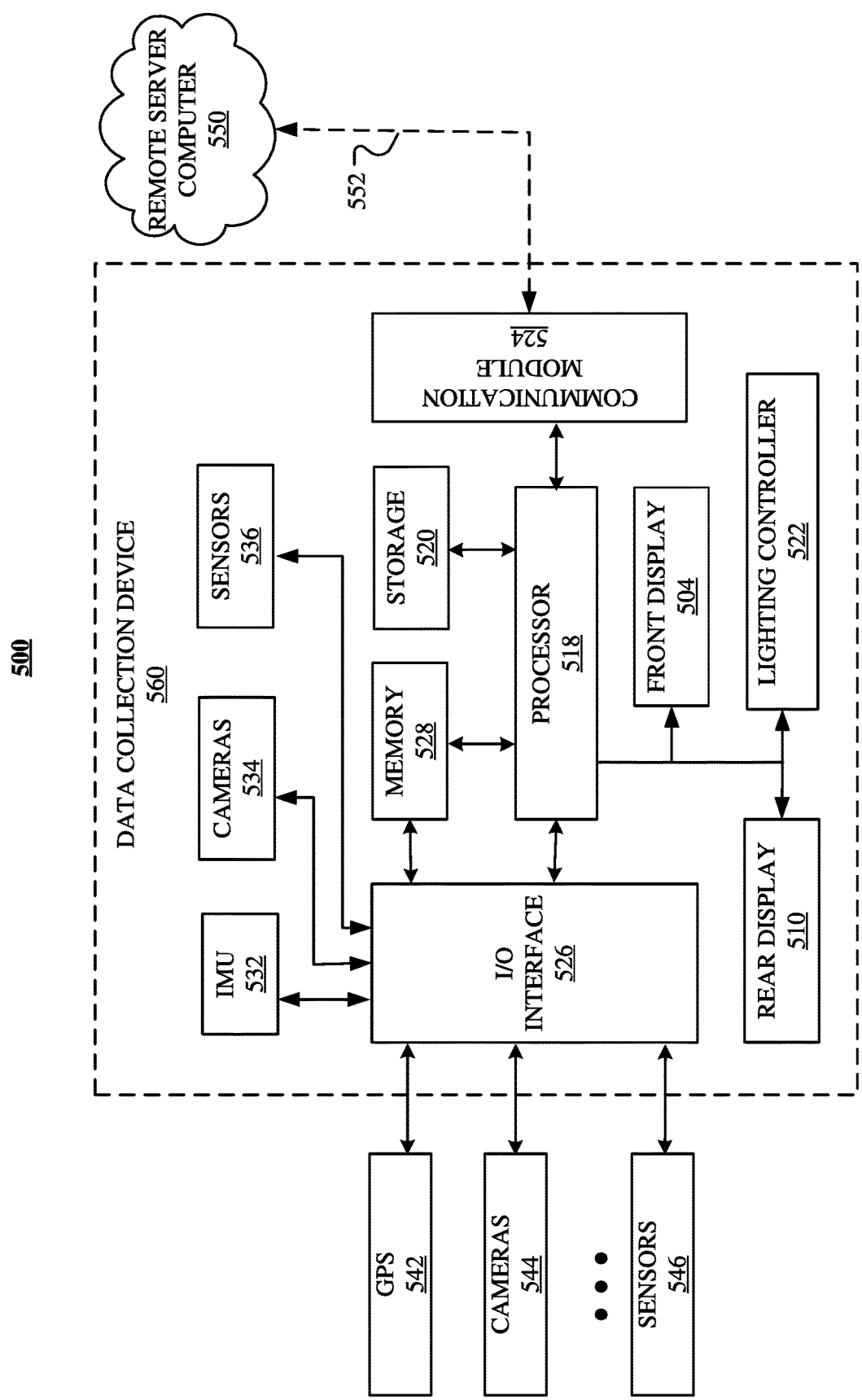
FIGS. 5A-5C illustrate an example data collection device used by the vehicle system.
Figure 5B:
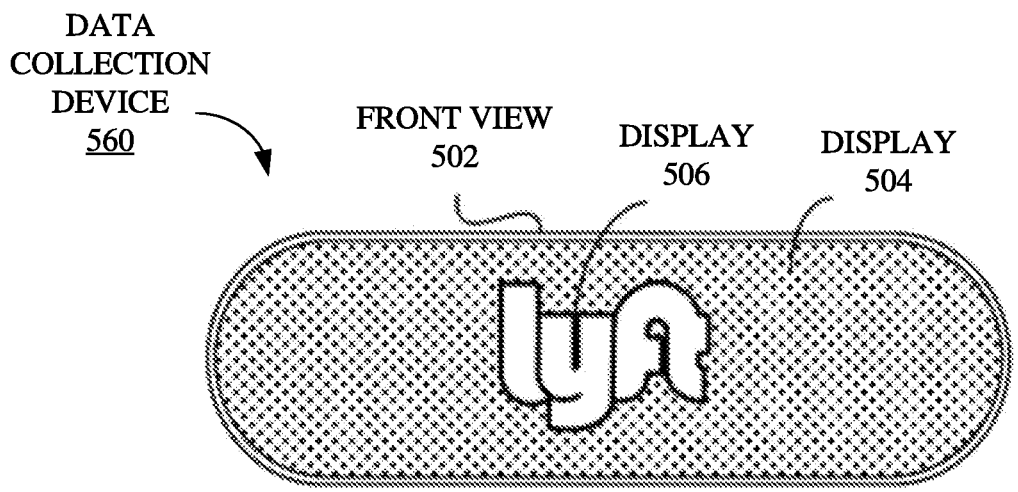
Figure 5C:
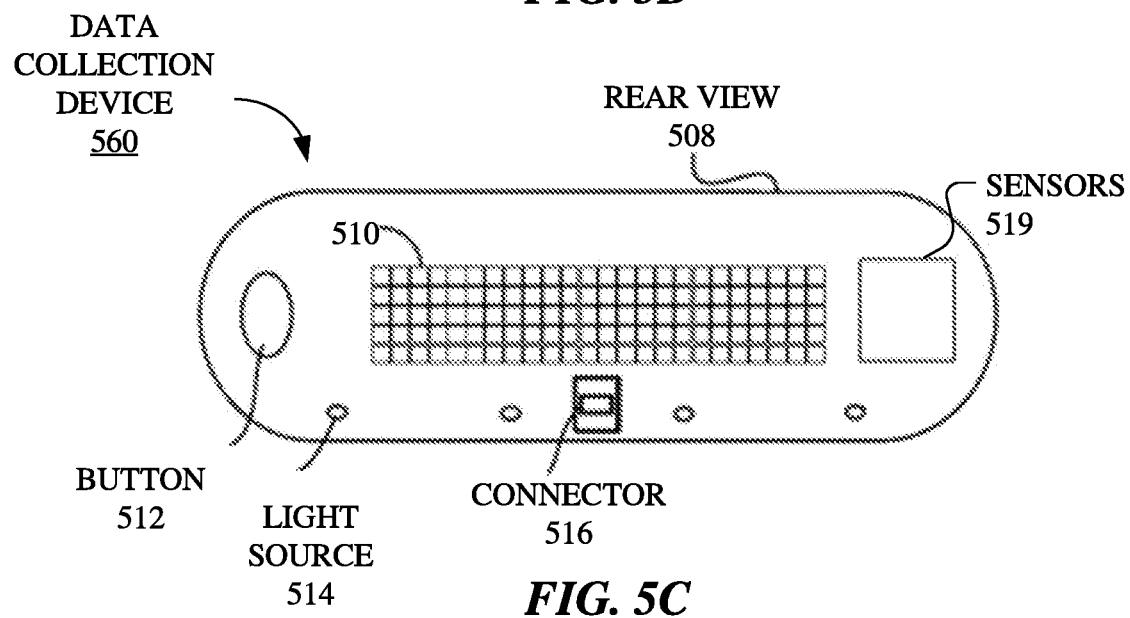

FIGS. 5A-5C illustrate an example data collection device used by the vehicle system. FIG. 5A illustrates a block diagram of various components of an example data collection device 560. The data collection device 560 may also be referred to as a transportation management vehicle device. In particular embodiments, the data collection device 560 may be integrated with the vehicle as a built-in device or may be associated with the vehicle as a detachable system. In particular embodiments, the data collection device 560 may include a number of sub-systems and modules including, for example, a logic control module (e.g., a processor 518, input/output (I/O) interface 526), a data storage module (a volatile memory 528, a non-volatile storage 520), a sensing module (e.g., an inertial measurement unit 532, cameras 534, sensors 536), a communication module 524, a display module (e.g., a front display 504, a rear display 510, a lighting controller 522), etc. In particular embodiments, the processor 518 may control the I/O interface 526 to collect data from both of the integrated sensors (e.g., IMU 532, cameras 534, sensors 536) that are integrated with the data collection device 560 and the vehicle sensors (e.g., a GPS 542, cameras 544, sensors 546) that are associated with the vehicle and communicate with the data collection device 560. The data collection device 560 may store the collected data in the volatile memory 528 (e.g., a random-access memory (RAM)) and/or in the non-volatile storage 520 (e.g., a hard disk drive, a solid-state drive, a flash drive, a compact disk, etc.). The data collection device 560 may also upload the collected data to a remote server computer 550 using the communication module 524 and through a wired or wireless connection 552 in real-time or at a later time.

In particular embodiments, the data collection device 560 may include one or more machine-learning models (e.g., prediction models, driving models, event classifier, traffic agent modelers, etc.) which may require considerable computational resources. In particular embodiments, the data collection device 560 may cooperate with another computing system (e.g., a mobile phone, a tablet, a mobile computer, a high-performance computer) for collecting and processing the data (e.g., running traffic agent modelers). In particular embodiments, the data collection device 560 may be implemented on a mobile phone or mobile computer using the API of that mobile phone or mobile computer. In particular embodiments, the data collection device 560 may be implemented on an embedded system platform including one or more GPUs or other processors which are specifically configured to run machine-learning models (e.g., neural networks).

In particular embodiments, the vehicle system 500 may include one or more sensors for monitoring the vehicle information (e.g., speeds, steering angles, braking pressure, etc.), the vehicle moving path or trajectory information (e.g., trajectories, locations, etc.), the human driver (e.g., eye movement, head movement, etc.), and the environment of the vehicle (e.g., identified objects with bounding boxes, other vehicles, pedestrians, etc.). In particular embodiments, the data collection device 560 may include one or more integrated sensors, for example, an inertial measurement unit 532, cameras 534, sensors 536, etc. The data collection device 560 may communicate with one or more sensors (e.g., a GPS 542, cameras 544, sensors 546, etc.) that are associated with the vehicle but are external to the data collection device 560. The vehicle system 500 may further include other sensing systems like LiDAR and radar systems. The sensors or sensing systems may monitor both the internal status (e.g., the vehicle itself and the passenger compartment area of a vehicle designed and intended for the seating of the driver and other passengers) and the external environment of the vehicle. For example, the data collection device 560 may include a rear-facing wide-angle camera that captures the passenger compartment and any passengers therein. As another example, the data collection device 560 may include a microphone that captures conversation and/or sounds in the passenger compartment. The data collection device may also include an infrared sensor capable of detecting motion and/or temperature of the passengers. Other examples of sensors may include, for example, but are not limited to: cameras for capturing visible data; microphones for capturing audible data; infrared sensors for detecting heat emitted by passengers; gyroscopes and accelerometers for detecting vehicle motion; speed sensors for detecting vehicle speed; steering sensors for measuring steering operations; pressure sensors for measuring pressure applied on braking pedal and acceleration pedal; a GPS for tracking vehicle location; and any other sensors or sensing systems (e.g., radar and LiDAR systems) suitable for monitoring the vehicle, the human driver, and the environment.

In particular embodiments, such sensors may be integrated with the vehicle system 500 which may be a human-driven vehicle or an autonomous vehicle. The sensors may be located at any suitable location, such as in the upper corners of the passenger compartment, the dashboard, seats, side doors, ceiling, rear view mirror, central console, floor, roof, lid, or any other locations where the sensor would be effective in detecting the type of signals it is designed for. In particular embodiments, such sensors may be integrated with a detachable computing device (e.g., a mobile phone, a tablet, a GPS, a dash camera) attached to the vehicle (e.g., on dashboard).

In particular embodiments, the communication module 524 may manage communications of the data collection device 560 with other systems including, for example, the remote server computer 550, a detachable computing device (e.g., a mobile phone, a tablet), a vehicle, the transportation management system, and third-party systems (e.g., music, entertainment, traffic, and/or maps providers). In particular embodiments, communication module 524 may be configured to communicate over WI-FI, Bluetooth, NFC, RF, LTE, 3G/4G/5G broadband cellular network or any other wired or wireless communication networks or protocols. In particular embodiments, the data collection device 560 may communicate with the vehicle through the communication module 524 to collected data from the sensors of the vehicle. In particular embodiments, the data collection device 560 may communicate with the remote server computer 550 through the communication module 524 for uploading data to the remote server computer 550 and synchronizing parameters related to one or more machine-learning models trained in the remote server computer 550.

In particular embodiments, the data collection device 524 may be configured to physically connect to the vehicle (e.g., through a connector 516 in FIG. 6C) for communicating with and getting power from the vehicle. For example, the connector 516 may implement the controller area network (CAN) bus interface or any other suitable communication interface or protocol for communicating with a vehicle. The CAN bus interface may interface with an on-board diagnostics (OBD) port (e.g., an OBD-I port, an OBD-II port, etc.) of the vehicle. In particular embodiments, the connector may include one or more universal serial bus (USB) ports, lightning connector ports, or other ports enabling users to directly connect their devices to the data collection device 560 (e.g., to exchange data, verify identity information, provide power, etc.). In particular embodiments, the data collection device 560 may be able to issue instructions (e.g., through the connector 516 in FIG. 5C) to the vehicle's onboard computer and cause it to adjust certain vehicle configurations. In particular embodiments, the data collection device 560 may be configured to query the vehicle (e.g., through the connector 516 in FIG. 5C) for certain data, such as current configurations of any of the aforementioned features, as well as the vehicle's speed, fuel level, tire pressure, external temperature gauges, navigation systems, and any other information available through the vehicle's computing system.

In particular embodiments, the data collection device 560 may include an input/output interface (I/O) 526 configured to receive inputs from and output instructions to sensors, users, and/or the vehicle. The I/O interface may include circuits and components for communication and signal conversion (e.g., analog-to-digital converters, digital-to-analog converters). The I/O interface 526 may be connected to the integrated sensors (e.g., an IMU 532, cameras 534, sensors 536) and the vehicle sensors (e.g., a GPS 542, cameras 544, sensors 546) for sending instructions to and receiving data from these sensors. For example, the I/O interface 526 may be connected to an image-capturing device configured to recognize motion or gesture-based inputs from passengers, a microphone configured to detect and record speech or dialog uttered, a heat sensor to detect the temperature in the passenger compartment, and any other suitable sensors. As another example, the I/O interface 526 may include an audio device configured to provide audio outputs (such as alerts, instructions, or other information) to users and/or receive audio inputs, such as audio commands, which may be interpreted by a voice recognition system or any other command interface.

In particular embodiments, the data collection device 560 may include one or more displays as shown in FIGS. 5B-C. The data collection device 560 may include a front display 504, a rear display 510, and a lighting controller 522. The front display 504 may be designed to face the outside of the vehicle so that it is visible to, e.g., ride requestors, and the rear display 510 may be designed to face the interior of the vehicle so that it is visible to, e.g., the passengers. The processor 518 may control information displayed on the rear display 510 and front display 504. As described herein, each display may be designed to display information to different intended users, depending on the positioning of the users and the data collection device 560. The data collection device 560 may control the front and rear display 504 and 510 based on display data of the data collection device 560. The display data may include stored display patterns, sequences, colors, text, animation or other data to be displayed on the front and/or rear display. The display data may also include algorithms for generating content and controlling how it is displayed. The generated content, for example, may be personalized based on information received from the transportation management system, any third-party system, the vehicle, and the computing devices of the provider and/or requestor. In particular embodiments, display data may be stored in the volatile memory 528 (e.g., a random-access memory (RAM)) and/or in the non-volatile storage 520 (e.g., a hard disk drive, a solid-state drive, a flash drive, a compact disk, etc.)

FIG. 5B illustrates a front view 502 of an example data collection device 560. A front view 502 of the data collection device 560 may include a front display 504. In particular embodiments, the front display 504 may include a secondary region or separate display 506. As shown in FIG. 6B, the front display 504 may include various display technologies including, but not limited to, one or more liquid crystal displays (LCDs), one or more arrays of light emitting diodes (LEDs), AMOLED, or other display technologies. In particular embodiments, the front display 504 may include a cover that divides the display into multiple regions. In particular embodiments, separate displays may be associated with each region. In particular embodiments, the front display 504 may be configured to show colors, text, animation, patterns, color patterns, or any other suitable identifying information to requestors and other users external to a provider vehicle (e.g., at a popular pick-up location, requestors may quickly identify their respective rides and disregard the rest based on the identifying information shown). In particular embodiments, the secondary region or separate display 506 may be configured to display the same, or contrasting, information as front display 504.

FIG. 5C illustrates a rear view 508 of an example data collection device 560. The rear view 508 may include a rear display 510, a button 512, one or more light sources 514, a connection 516, and one more sensors 519. As with the front display 504, the rear display 510 may include various display technologies including, but not limited to, one or more liquid crystal displays (LCDs), one or more arrays of light emitting diodes (LEDs), AMOLED, or other display technologies. The rear display 510 may be configured to display information to the provider, the requestor, or other passengers in the passenger compartment of the vehicle. In particular embodiments, rear display 510 may be configured to provide information to people who are external to and behind the provider vehicle. Information may be conveyed via, e.g., scrolling text, color, patterns, animation, and any other visual display. As further shown in FIG. 6C, the data collection device 560 may include a power button 512 or any other suitable user interface that can be used to turn the device 560 on or off. In particular embodiments, power button 512 may be a hardware button or switch that physically controls whether power is provided to the data collection device 560. Alternatively, power button 512 may be a soft button that initiates a startup/shutdown procedure managed by software and/or firmware instructions. Additionally, the data collection device 560 may include one or more light features 514 (such as one or more LEDs or other light sources) configured to illuminate areas adjacent to the device 560 and/or provide status signals.

In particular embodiments, the data collection device 560 include a lighting controller to control the colors and/or other lighting displayed by the front display 504, and/or the rear display 510. The lighting controller may include rules and algorithms for controlling the displays so that the intended information is conveyed. For example, to help a set of matching provider and requestor find each other at a pick-up location, the lighting controller may obtain instructions that the color blue is to be used for identification. In response, the front display 504 may display blue and the lighting controller may cause the light features 514 to display blue so that the ride provider would know what color to look for.

Figure 6:
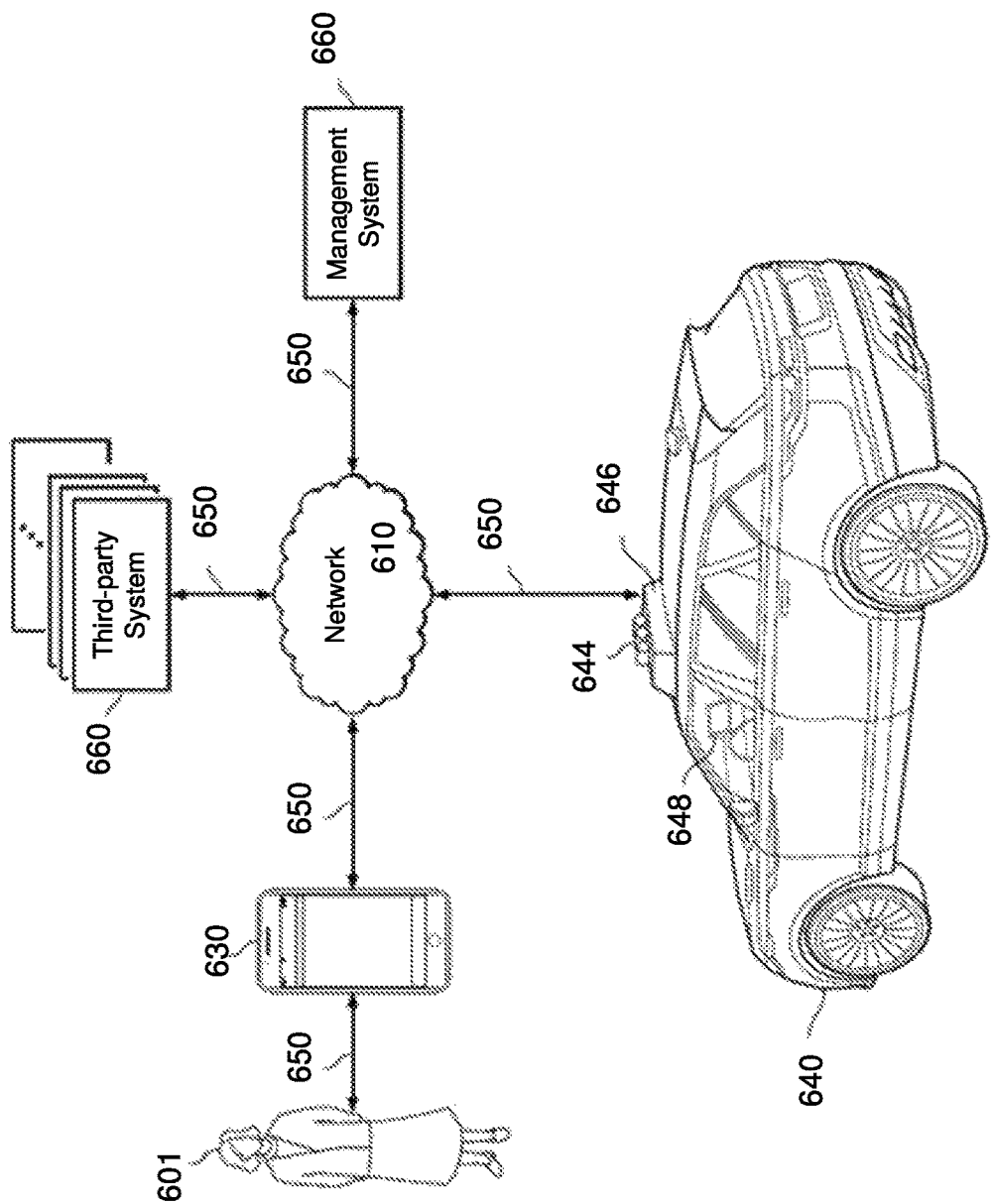
FIG. 6 illustrates an example block diagram of a transportation management environment for matching ride requestors with autonomous vehicles.

FIG. 6 illustrates an example block diagram of a transportation management environment for matching ride requestors with autonomous vehicles. In particular embodiments, the environment may include various computing entities, such as a user computing device 630 of a user 601 (e.g., a ride provider or requestor), a transportation management system 660, an autonomous vehicle 640, and one or more third-party system 670. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, autonomous-vehicles 640, third-party systems 670, and networks 610.

The user device 630, transportation management system 660, autonomous vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, autonomous vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the autonomous vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, Calif., the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU and/or GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and/or 2G/3G/4G/LTE mobile communication standard. User device 630 may also include one or more cameras, scanners, touchscreens, microphones, speakers, and any other suitable input-output devices.

In particular embodiments, the vehicle 640 may be an autonomous vehicle and equipped with an array of sensors 644, a navigation system 646, and a ride-service computing device 648. In particular embodiments, a fleet of autonomous vehicles 640 may be managed by the transportation management system 660. The fleet of autonomous vehicles 640, in whole or in part, may be owned by the entity associated with the transportation management system 660, or they may be owned by a third-party entity relative to the transportation management system 660. In either case, the transportation management system 660 may control the operations of the autonomous vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the autonomous vehicles 640 may receive data from and transmit data to the transportation management system 660 and the third-party system 670. Example of received data may include, e.g., instructions, new software or software updates, maps, 3D models, trained or untrained machine-learning models, location information (e.g., location of the ride requestor, the autonomous vehicle 640 itself, other autonomous vehicles 640, and target destinations such as service centers), navigation information, traffic information, weather information, entertainment content (e.g., music, video, and news) ride requestor information, ride information, and any other suitable information. Examples of data transmitted from the autonomous vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and/or third-party system 670), and any other suitable data.

In particular embodiments, autonomous vehicles 640 may also communicate with each other as well as other traditional human-driven vehicles, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 660 or third-party system 670).

In particular embodiments, an autonomous vehicle 640 may obtain and process sensor/telemetry data. Such data may be captured by any suitable sensors. For example, the vehicle 640 may have aa Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and/or hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity;

global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on autonomous vehicle 640 in FIG. 6, sensors 644 may be located in any suitable location in or on autonomous vehicle 640. Example locations for sensors include the front and rear bumpers, the doors, the front windshield, on the side panel, or any other suitable location.

In particular embodiments, the autonomous vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the autonomous vehicle 640 may have a navigation system 646 responsible for safely navigating the autonomous vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the autonomous vehicle 640 to its destinations without colliding into other objects. Although the physical embodiment of the navigation system 646 (e.g., the processing unit) appears in a particular location on autonomous vehicle 640 in FIG. 6, navigation system 646 may be located in any suitable location in or on autonomous vehicle 640. Example locations for navigation system 646 include inside the cabin or passenger compartment of autonomous vehicle 640, near the engine/battery, near the front seats, rear seats, or in any other suitable location.

In particular embodiments, the autonomous vehicle 640 may be equipped with a ride-service computing device 648, which may be a tablet or any other suitable device installed by transportation management system 660 to allow the user to interact with the autonomous vehicle 640, transportation management system 660, other users 601, or third-party systems 670. In particular embodiments, installation of ride-service computing device 648 may be accomplished by placing the ride-service computing device 648 inside autonomous vehicle 640, and configuring it to communicate with the vehicle 640 via a wire or wireless connection (e.g., via Bluetooth). Although FIG. 6 illustrates a single ride-service computing device 648 at a particular location in autonomous vehicle 640, autonomous vehicle 640 may include several ride-service computing devices 648 in several different locations within the vehicle. As an example and not by way of limitation, autonomous vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of autonomous vehicle 640. This may allow users to handle ride-service computing device 648 in a manner consistent with other tablet computing devices. As an example and not by way of limitation, a user may move ride-service computing device 648 to any location in the cabin or passenger compartment of autonomous vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
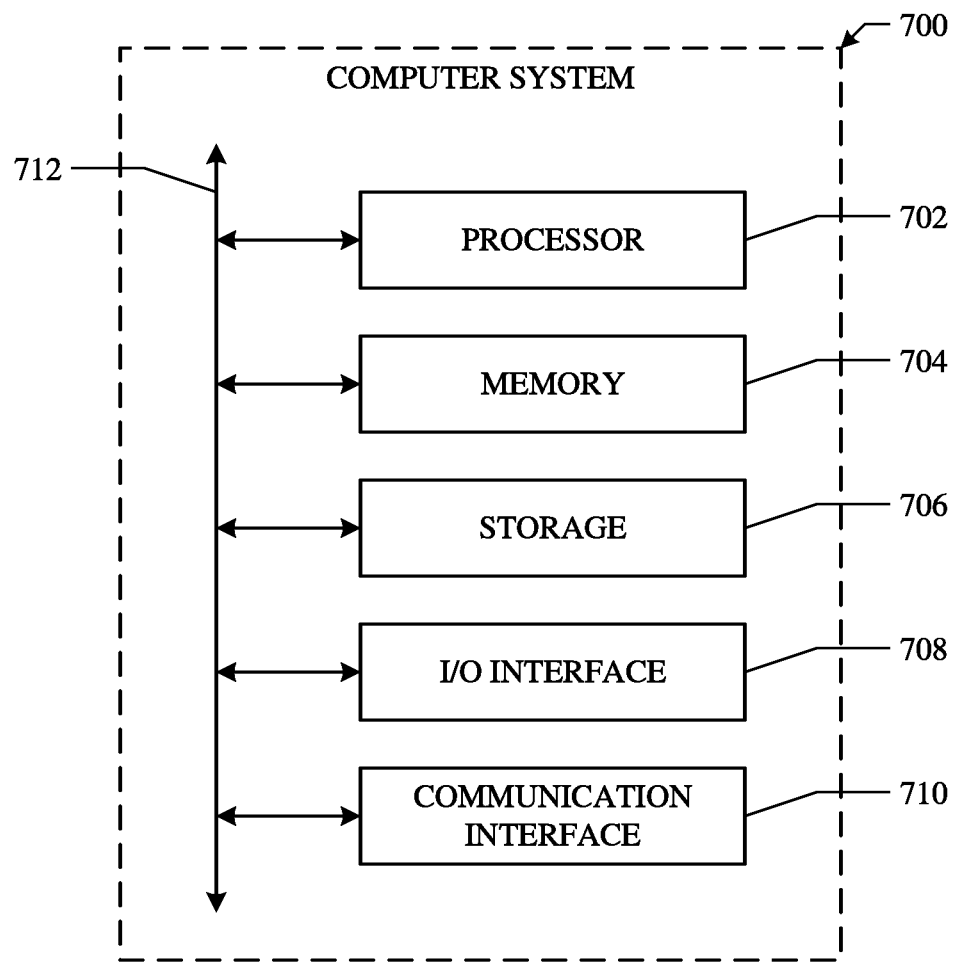
FIG. 7 illustrates an example computing system.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a remote server computer, which may include one or more remote server computing components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system of a vehicle:
   capturing, using one or more sensors of the vehicle, one or more identifying features associated with a vehicle of interest located in a geographic region;
   based on the one or more identifying features associated with the vehicle of interest, determining whether an individualized driving behavior model of the vehicle of interest is available for predicting behavior of the vehicle of interest, wherein the individualized driving behavior model is based on observed vehicle behavior of the vehicle of interest; and
   subsequent to determining that the individualized driving behavior model of the vehicle of interest is unavailable for predicting the behavior of the vehicle of interest:
   selecting, based on the geographic region where the vehicle of interest is located, a region-based driving behavior model from a plurality of driving behavior models associated with different geographic regions, wherein the plurality of driving behavior models are based on observations of vehicle behavior of vehicles in the different geographic regions,
   predicting the behavior of the vehicle of interest in the geographic region based on at least the region-based driving behavior model, and
   determining a vehicle operation for the vehicle based on at least the predicted behavior of the vehicle of interest.

2. The method of claim 1, wherein the one or more identifying features associated with the vehicle of interest comprise an anonymous identifier of the vehicle of interest, and wherein the individualized driving behavior model is associated with the anonymous identifier of the vehicle of interest.

3. The method of claim 2, wherein the anonymous identifier is generated based on a license plate of the vehicle of interest.

4. The method of claim 2, wherein the anonymous identifier obfuscates an identity of the vehicle of interest and causes the computer system to be agnostic to the identity of the vehicle interest, and wherein the anonymous identifier anonymously associates the individualized driving behavior model to the vehicle of interest.

5. The method of claim 1, further comprising:
determining specification information of the vehicle of interest based on an image comprising at least a part of the vehicle of interest, wherein the specification information comprises one or more dimensions of the vehicle of interest; and
determining a bounding box for the vehicle of interest based on the specification information.

6. The method of claim 5, further comprising:
determining a future location of the vehicle of interest based at least on the bounding box of the vehicle of interest, wherein the vehicle operation is determined based at least on the future location of the vehicle of interest.

7. The method of claim 5, wherein the specification information comprises a vehicle weight and one or more performance parameters of the vehicle of interest, and the method further comprises:
determining an acceleration envelope for the vehicle of interest based on the vehicle weight and the one or more performance parameters of the vehicle of interest; and
determining a predicted moving path for the vehicle of interest based on the acceleration envelope of the vehicle of interest.

8. The method of claim 1, further comprising:
determining, using the one or more sensors of the vehicle, contextual data of an environment surrounding the vehicle of interest, wherein predicting the behavior of the vehicle of interest is based on at least the contextual data of the surrounding environment, and wherein the region-based driving behavior model is based on driving situations that are associated with similar contextual data to the contextual data of the surrounding environment of the vehicle of interest.

9. The method of claim 1, wherein the vehicle operation comprises one or more of:
delaying a vehicle acceleration operation for a period of time;
executing a vehicle acceleration operation ahead of a previously planned time;
executing a speed reduction operation;
increasing a distance to the vehicle of interest;
adopting a new driving trajectory;
keeping a distance to the vehicle of interest above a threshold distance;
yielding a right of way;
sending warning signals to the vehicle of interest;
sending warning signals to a driver of the vehicle;
allocating more sensing resources for monitoring the vehicle of interest;
switching driving lanes; or
avoiding intersecting a predicted driving trajectory of the vehicle of interest.

10. The method of claim 1, further comprising:
detecting, using the one or more sensors, an opt-out indicator associated with the vehicle of interest; and
excluding, in response to the detected opt-out indicator, the vehicle of interest from a data collection process for collecting driving behavior data related to the vehicle of interest.

11. The method of claim 1, wherein the region-based driving behavior model is selected in response to a determination that a possibility score for the individualized driving behavior model satisfies a pre-determined threshold score.

12. The method of claim 1, wherein the behavior of the vehicle of interest is predicted by feeding vehicle driving data associated with the region-based driving behavior model and contextual data of a surrounding environment of the vehicle of interest to a prediction model, and wherein the prediction model is trained based on comparisons between the observations of the vehicles in the geographic region and corresponding predictions for the vehicles using current weighting factors of the prediction.

13. The method of claim 1, wherein the region-based driving behavior model is generated based on an aggregation of driving behavior data of one or more other observed vehicles that have driven in one or more other geographic regions that are within a similarity threshold with respect to the geographic region, and wherein the one or more other observed vehicles have the one or more identifying features.

14. The method of claim 1, further comprising:
determining a similarity level between the geographic region where the vehicle of interest is located and an additional geographic region associated with an additional region-based driving behavior model;
in response to the similarity level satisfying a threshold level, selecting the additional region-based driving behavior model; and
predicting subsequent behavior of the vehicle of interest based on the selected additional region-based driving behavior model associated with the additional geographic region.

15. The method of claim 1, further comprising:
determining a similarity level of a vehicle type of the vehicle of interest with respect to an additional vehicle type;
in response to the similarity level satisfying a threshold level, selecting a vehicle-type-based driving behavior model associated with the additional vehicle type and the geographic region where the vehicle is located; and
predicting subsequent behavior of the vehicle of interest based on the selected vehicle-type-based driving behavior model associated the additional vehicle type and the geographic region.

16. One or more non-transitory computer-readable storage media including instructions that are operable, when executed by at least one processor of a computing system of a vehicle, to cause the computing system to:
capture, using one or more sensors of the vehicle, one or more identifying features associated with a vehicle of interest located in a geographic region;
based on the one or more identifying features associated with the vehicle of interest, determine whether an individualized driving behavior model of the vehicle of interest is available for predicting behavior of the vehicle of interest, wherein the individualized driving behavior model is based on observed vehicle behavior of the vehicle of interest; and
in response to a determination that the individualized driving behavior model of the vehicle of interest is unavailable for predicting the behavior of the vehicle of interest:
select, based on the geographic region where the vehicle of interest is located, a region-based driving behavior model from a plurality of driving behavior models associated with different geographic regions, wherein the plurality of driving behavior models are based on observations of vehicle behavior of vehicles in the different geographic regions, predict the behavior of the vehicle of interest in the geographic region based on at least the region-based driving behavior model, and determine a vehicle operation for the vehicle based on at least the predicted driving behavior of the vehicle of interest.

17. The media of claim 16, wherein the one or more identifying features associated with the vehicle of interest comprise an anonymous identifier of the vehicle of interest, and wherein the individualized driving behavior model is associated with the anonymous identifier of the vehicle of interest.

18. The media of claim 17, wherein the anonymous identifier is generated based on a license plate of the vehicle of interest.

19. A system of a vehicle, the system comprising:

one or more non-transitory computer-readable storage media embodying instructions; and one or more processors coupled to the one or more non-transitory computer-readable storage media and operable to execute the instructions to:

capture, using one or more sensors of the vehicle, one or more identifying features associated with a vehicle of interest located in a geographic region;

based on the one or more identifying features associated with the vehicle of interest, determine whether an individualized driving behavior model of the vehicle of interest is available for predicting behavior of the vehicle of interest, wherein the individualized driving behavior model is based on observed vehicle behavior of the vehicle of interest; and in response to a determination that the individualized driving behavior model of the vehicle of interest is unavailable for predicting the behavior of the vehicle of interest:

select, based on the geographic region where the vehicle of interest is located, a region-based driving behavior model from a plurality of driving behavior models associated with different geographic regions, wherein the plurality of driving behavior models are based on observations of vehicle behavior of vehicles in the different geographic regions, predict the behavior of the vehicle of interest in the geographic region based on at least the region-based driving behavior model, and determine a vehicle operation for the vehicle based on at least the predicted driving behavior of the vehicle of interest.

20. The system of claim 19, wherein the one or more identifying features associated with the vehicle of interest comprise an anonymous identifier of the vehicle of interest, and wherein the individualized model is associated with the anonymous identifier of the vehicle of interest.

* * * * *